US009812156B2

(12) United States Patent
Sasaki et al.

(10) Patent No.: US 9,812,156 B2
(45) Date of Patent: Nov. 7, 2017

(54) THERMALLY-ASSISTED MAGNETIC RECORDING HEAD INCLUDING A MAIN POLE AND A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Hideo Mamiya, Milpitas, CA (US); Hironori Araki, Milpitas, CA (US); Seiichiro Tomita, Milpitas, CA (US)

(72) Inventors: Yoshitaka Sasaki, Santa Clara, CA (US); Hiroyuki Ito, Milpitas, CA (US); Shigeki Tanemura, Milpitas, CA (US); Hideo Mamiya, Milpitas, CA (US); Hironori Araki, Milpitas, CA (US); Seiichiro Tomita, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/600,460

(22) Filed: Jan. 20, 2015

(65) Prior Publication Data

US 2016/0210994 A1 Jul. 21, 2016

(51) Int. Cl.
*G11B 5/127* (2006.01)
*G11B 5/31* (2006.01)
(Continued)

(52) U.S. Cl.
CPC ............. *G11B 5/314* (2013.01); *G11B 5/127* (2013.01); *G11B 5/6088* (2013.01); *G11B 5/012* (2013.01);
(Continued)

(58) Field of Classification Search
None
See application file for complete search history.

(56) References Cited

U.S. PATENT DOCUMENTS

| 8,427,927 B1* | 4/2013 | Chou | .............. G11B 5/3116 360/125.31 |
|---|---|---|---|
| 8,456,968 B1 | 6/2013 | Sasaki et al. | |

(Continued)

FOREIGN PATENT DOCUMENTS

| JP | 2010-61782 A | 3/2010 |
|---|---|---|
| JP | 2012-256403 A | 12/2012 |

(Continued)

OTHER PUBLICATIONS

May 10, 2017 Office Action issued in Japanese Patent Application No. 2015-237367.

(Continued)

*Primary Examiner* — Brian Butcher
(74) *Attorney, Agent, or Firm* — Oliff PLC

(57) ABSTRACT

A thermally-assisted magnetic recording head includes a main pole and a plasmon generator. The main pole has a front end face located in the medium facing surface. The plasmon generator has a near-field light generating surface located in the medium facing surface. The front end face of the main pole includes a first end face portion and a second end face portion. The second end face portion is located farther from the near-field light generating surface than is the first end face portion, and is greater than the first end face portion in width in the track width direction. The first end face portion and the near-field light generating surface are equal in width.

11 Claims, 37 Drawing Sheets

(51) Int. Cl.
    *G11B 5/60*         (2006.01)
    *G11B 5/00*         (2006.01)
    *G11B 5/012*       (2006.01)

(52) U.S. Cl.
    CPC .... *G11B 5/1272* (2013.01); *G11B 2005/0021* (2013.01)

(56) References Cited

U.S. PATENT DOCUMENTS

| | | |
|---|---|---|
| 8,614,932 B1 | 12/2013 | Sasaki et al. |
| 2010/0061200 A1 | 3/2010 | Shimazawa et al. |
| 2011/0170381 A1 | 7/2011 | Matsumoto |
| 2012/0314323 A1 | 12/2012 | Sasaki et al. |
| 2013/0107681 A1* | 5/2013 | Sasaki .................... G11B 5/314 369/13.33 |
| 2014/0269237 A1 | 9/2014 | Sasaki et al. |

FOREIGN PATENT DOCUMENTS

| | | |
|---|---|---|
| JP | 2013-171613 A | 9/2013 |
| JP | 2014-059941 A | 4/2014 |

OTHER PUBLICATIONS

Nov. 30, 2016 Office Action issued in Japanese Patent Application No. 2015-237367.

* cited by examiner

THERMALLY-ASSISTED MAGNETIC RECORDING HEAD INCLUDING A MAIN POLE AND A PLASMON GENERATOR

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To eliminate this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 discloses a thermally-assisted magnetic recording head including a main pole, a waveguide and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that occurs on the surface of the core based on the light propagating through the core, and to cause near-field light to be generated from the end face of the plasmon generator based on the excited surface plasmons.

A thermally-assisted magnetic recording head including a plasmon generator causes a spot of near-field light to be formed on a recording medium by the plasmon generator. The size of the spot of near-field light will hereinafter be referred to as light spot size. It has conventionally been considered that a smaller light spot size is effective for achieving higher recording density.

On the recording medium, the spot of near-field light generates a temperature distribution such that the temperature peaks at the center of the spot, and decreases with increasing distance from the center. Magnetic recording is typically performed on a ring-shaped region on the recording medium, the region having a temperature of 400° C. to 500° C. Hereinafter, a region on the recording medium formed by a combination of the aforementioned ring-shaped region having a temperature of 400° C. to 500° C. and a region on the inner side thereof will be referred to as thermal spot. Conventionally, track width depends on the thermal spot size.

The light spot size can be reduced to the order of 50 nm by downsizing the plasmon generator or reducing the power of the laser light for use to generate near-field light. However, since the heat resulting from near-field light spreads on the recording medium by conduction, the thermal spot size becomes larger than the light spot size. It is thus difficult to sufficiently reduce track width and thereby sufficiently increase recording density with the approach of reducing the light spot size.

U.S. Patent Application Publication No. 2011/0170381 A1 discloses the technique to form a plasmon generator by etching a metal layer using either the main pole or a mask for use to etch the main pole. This technique suffers from the problem that if the end face of the main pole and the end face of the plasmon generator are both reduced in width, the main pole becomes unable to pass much magnetic flux, thus becoming unable to produce a write magnetic field of sufficient magnitude from the end face of the main pole.

OBJECT AND SUMMARY OF THE INVENTION

It is an object of the present invention to provide a thermally-assisted magnetic recording head with a reduced track width and a main pole for producing a write magnetic field of sufficient magnitude, and to provide a method of manufacturing such a thermally-assisted magnetic recording head.

A thermally-assisted magnetic recording head of the present invention includes: a medium facing surface configured to face a recording medium; a coil for producing a magnetic field corresponding to data to be written on the recording medium; a main pole; a waveguide; and a plasmon generator. The main pole has a front end face located in the medium facing surface. The waveguide includes a core and a cladding, the core allowing light to propagate therethrough, the cladding being provided around the core. The plasmon generator has a near-field light generating surface located in the medium facing surface.

The main pole is configured to pass a magnetic flux corresponding to the magnetic field produced by the coil, and to produce from the front end face a write magnetic field for writing data on the recording medium. The plasmon generator is configured to excite a surface plasmon on the plasmon generator based on the light propagating through the core, and to generate near-field light from the near-field light generating surface based on the surface plasmon. The front end face of the main pole and the near-field light generating surface are at locations different from each other in the direction of travel of the recording medium. The front end face of the main pole includes a first end face portion, and a second end face portion contiguous with the first end face portion. The second end face portion is located farther from the near-field light generating surface than is the first end face portion, and is greater than the first end face portion in width in the track width direction. The first end face portion has a first edge and a second edge opposite to each other in the track width direction. The near-field light generating surface has a third edge and a fourth edge opposite to each other in the track width direction. The first edge and the third edge are located on a first imaginary straight line. The second edge and the fourth edge are located on a second imaginary straight line parallel to the first imaginary straight line.

The thermally-assisted magnetic recording head of the present invention may further include a dielectric layer provided between the main pole and the plasmon generator.

In the thermally-assisted magnetic recording head of the present invention, the core may have an evanescent light generating surface for generating evanescent light based on the light propagating through the core, and the plasmon generator may have a plasmon exciting section located at a predetermined distance from the evanescent light generating surface and facing the evanescent light generating surface. In this case, in the plasmon generator, a surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

In the thermally-assisted magnetic recording head of the present invention, the front end face of the main pole may be located on the front side in the direction of travel of the recording medium relative to the near-field light generating surface.

In the thermally-assisted magnetic recording head of the present invention, the main pole may include a first layer, and a second layer stacked on the first layer. In this case, the first layer has the first end face portion, and the second layer has the second end face portion.

The first layer may further have a first rear end face portion farthest from the medium facing surface. The second layer may further have a second rear end face portion farthest from the medium facing surface. In this case, the first rear end face portion and the second rear end face portion may be located at the same distance from the medium facing surface.

The thermally-assisted magnetic recording head of the present invention may further include a heat sink having an outer surface. In this case, the plasmon generator may have a top surface including a first region and a second region, the second region being located farther from the medium facing surface than the first region. Further, the first layer of the main pole may have a bottom surface opposed to the first region of the top surface of the plasmon generator, and a first side surface and a second side surface located at opposite ends of the first layer in the track width direction. The second layer of the main pole may have a third side surface and a fourth side surface located at opposite ends of the second layer in the track width direction. The outer surface of the heat sink may include: a first portion opposed to the second region of the top surface of the plasmon generator; a second portion opposed to the first rear end face portion; a third portion opposed to the second rear end face portion; a fourth portion opposed to at least part of the third side surface; and a fifth portion opposed to at least part of the fourth side surface. The outer surface of the heat sink may further include a sixth portion opposed to at least part of the first side surface, and a seventh portion opposed to at least part of the second side surface.

The thermally-assisted magnetic recording head of the present invention further includes: a shield formed of a magnetic material and having an end face located in the medium facing surface; and a return path section formed of a magnetic material, connecting the main pole and the shield to each other and passing a magnetic flux corresponding to the magnetic field produced by the coil.

The near-field light generating surface may be located between the front end face of the main pole and at least part of the end face of the shield. The return path section may include a first yoke portion, a second yoke portion, a first columnar portion, a second columnar portion, and a third columnar portion. The first yoke portion, the second yoke portion and the first columnar portion are located on the same side in the direction of travel of the recording medium relative to the core. The first columnar portion is located away from the medium facing surface and has a first end and a second end opposite to each other in the direction of travel of the recording medium. The second and third columnar portions are located closer to the medium facing surface than is the first columnar portion. The first yoke portion connects the main pole to the first end of the first columnar portion. The second columnar portion and the third columnar portion are located on opposite sides of the plasmon generator in the track width direction, and are connected to the shield. The second yoke portion is connected to the second end of the first columnar portion, and is connected to the shield via the second and third columnar portions. The coil is wound around the first columnar portion.

The end face of the shield may include a first side shield end face and a second side shield end face located on opposite sides of the first end face portion of the front end face of the main pole in the track width direction.

A first and a second manufacturing method for the thermally-assisted magnetic recording head of the present invention each include the steps of forming the waveguide, forming the plasmon generator and the main pole, and forming the coil.

In the first manufacturing method, the main pole is formed to include a first layer, and a second layer stacked on the first layer. The first layer has the first end face portion, and the second layer has the second end face portion. In the first manufacturing method, the step of forming the plasmon generator and the main pole includes the steps of forming an initial plasmon generator; forming a first magnetic layer for use to form the first layer of the main pole; etching the initial plasmon generator into the plasmon generator by using the first magnetic layer as an etching mask; and forming a second magnetic layer on the first magnetic layer, the second magnetic layer being intended for use to form the second layer of the main pole.

In the second manufacturing method, the step of forming the plasmon generator and the main pole includes the steps of forming an initial plasmon generator; forming an etching mask for use to pattern the initial plasmon generator; etching the initial plasmon generator into the plasmon generator by using the etching mask; forming a surrounding layer of a dielectric material around the plasmon generator and the etching mask; removing the etching mask so that a recess is formed by the plasmon generator and the surrounding layer; and forming a magnetic layer such that a portion thereof is received in the recess, the magnetic layer being intended for use to form the main pole.

According to the present invention, the front end face of the main pole includes the first end face portion and the second end face portion, the second end face portion being greater than the first end face portion in width in the track width direction. The track width depends on the width of the first end face portion of the front end face of the main pole. The present invention thus make it possible to achieve a small track width and allows for production of a write magnetic field of sufficient magnitude from the main pole.

Other and further objects, features and advantages of the present invention will appear more fully from the following description.

DETAILED DESCRIPTION OF THE PREFERRED EMBODIMENTS

First Embodiment

Figure 1:
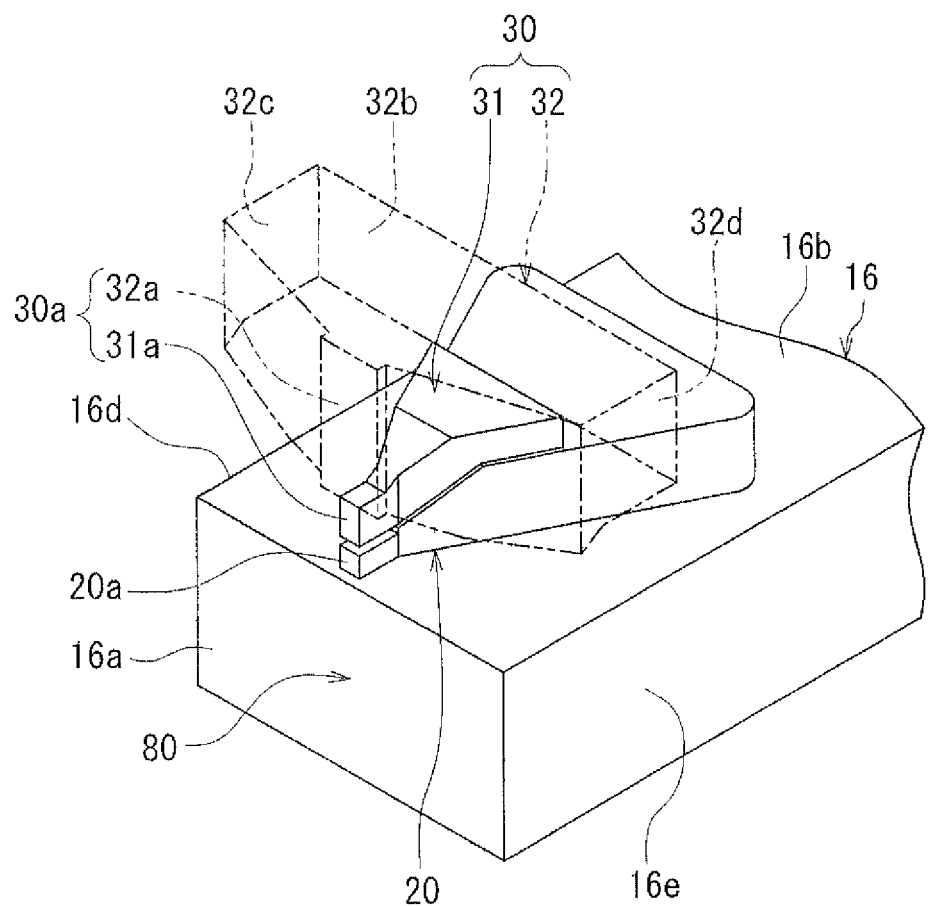
FIG. 1 is a perspective view showing the main part of a thermally-assisted magnetic recording head according to a first embodiment of the invention.
Figure 2:
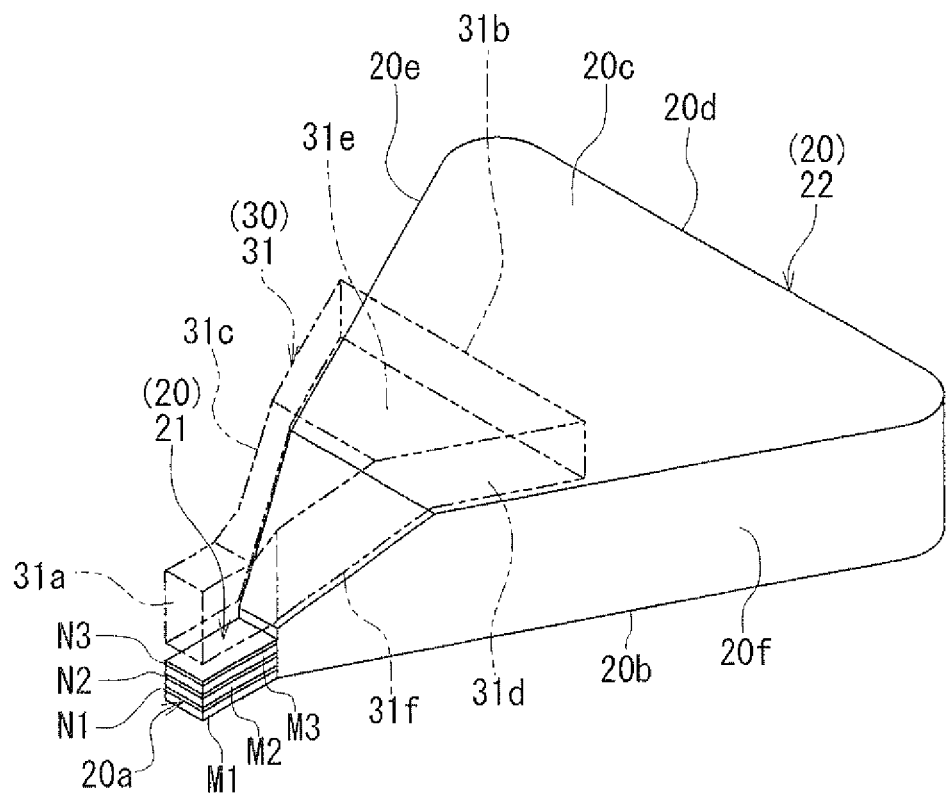
FIG. 2 is an enlarged perspective view of a part of FIG. 1.
Figure 3:
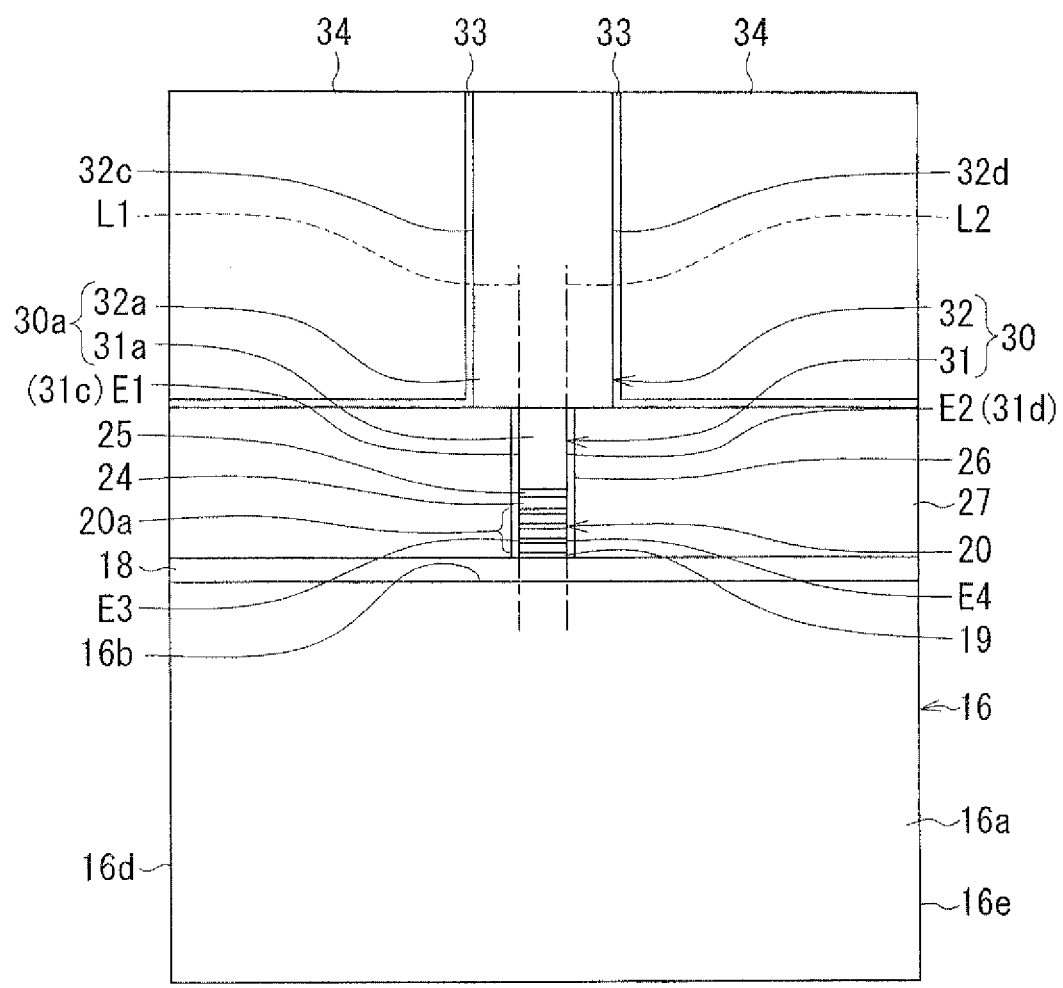
FIG. 3 is a front view showing the main part of the thermally-assisted magnetic recording head according to the first embodiment of the invention.
Figure 4:
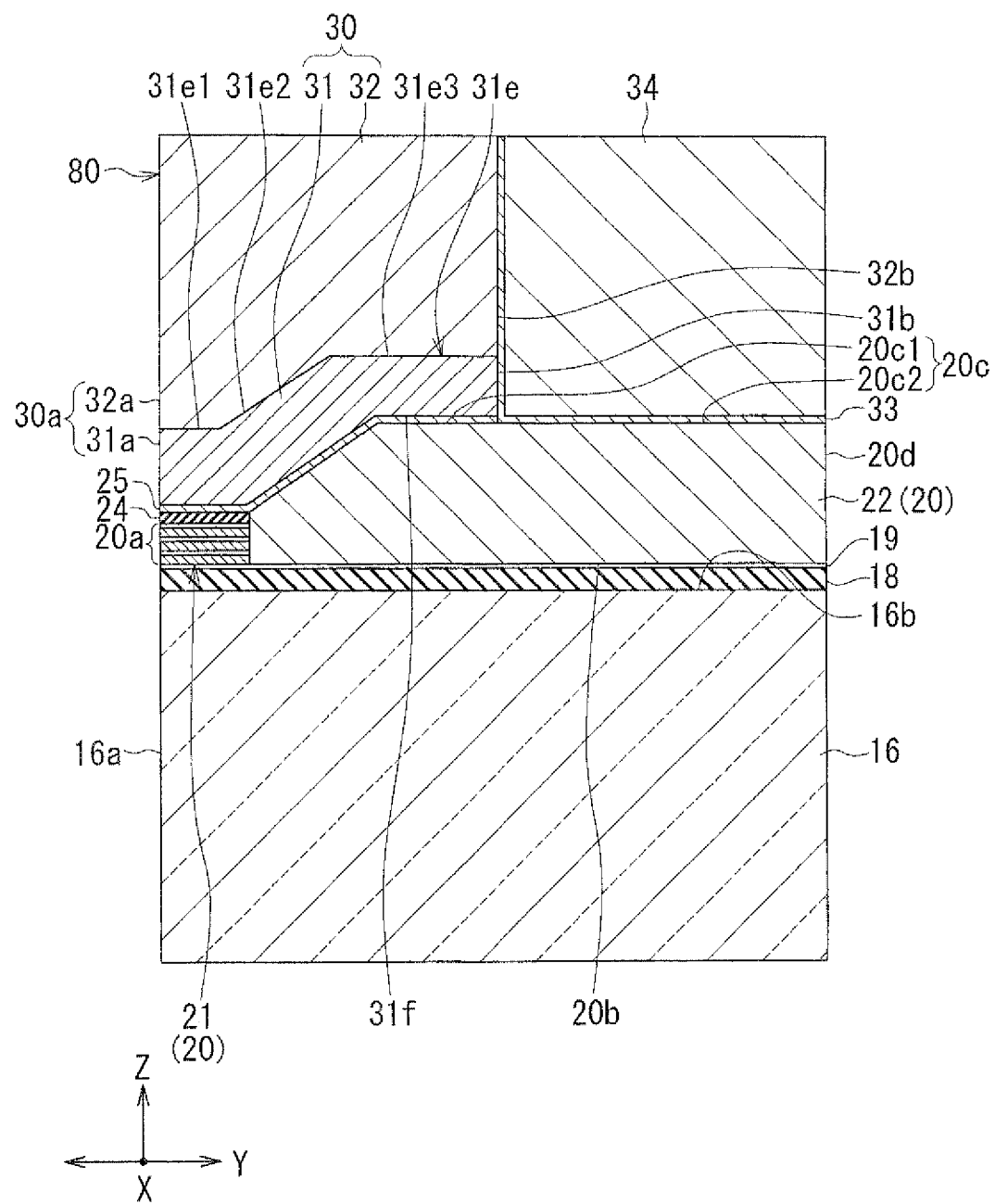
FIG. 4 is a cross-sectional view showing the main part of the thermally-assisted magnetic recording head according to the first embodiment of the invention.
Figure 5:
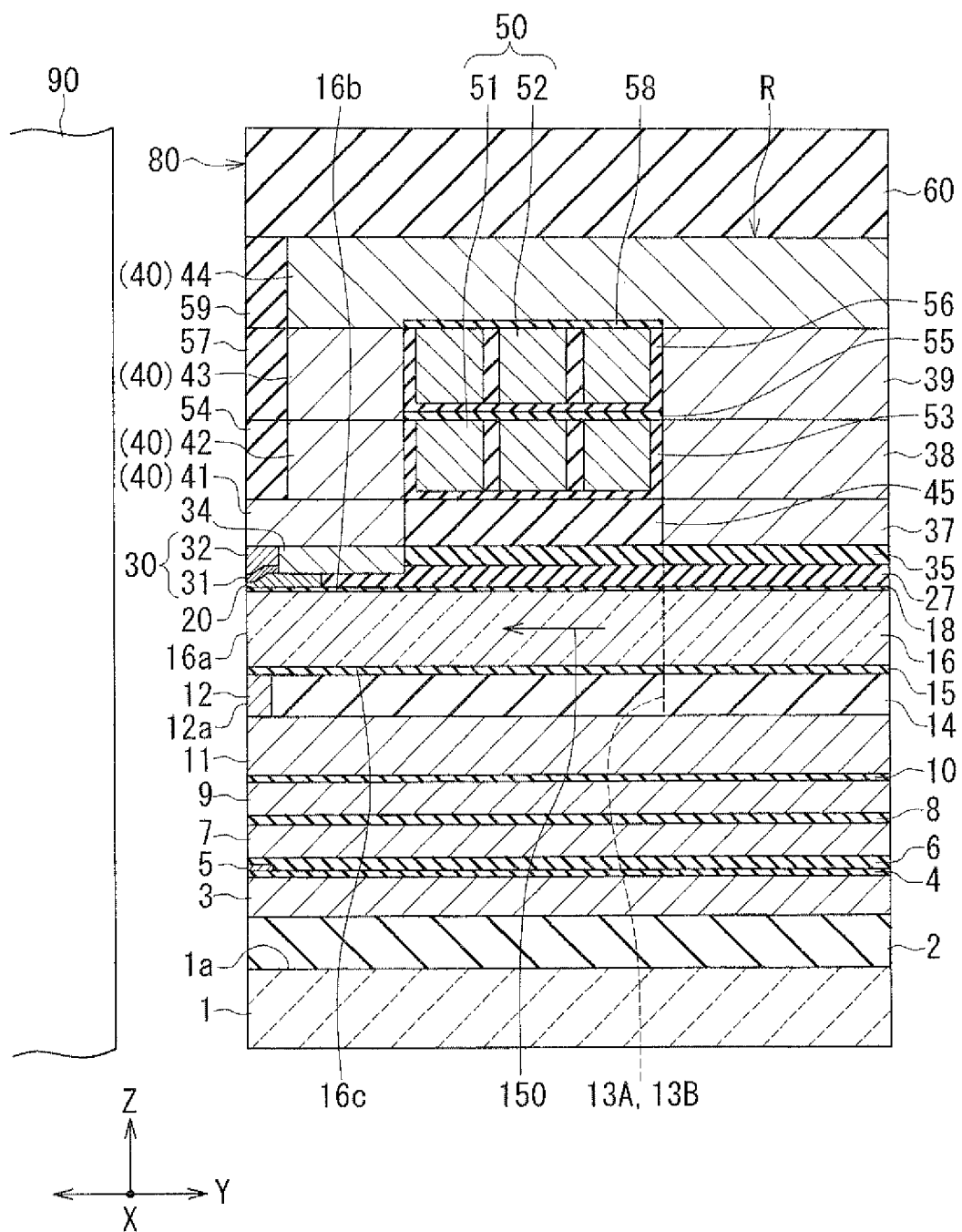
FIG. 5 is a cross-sectional view showing the configuration of the thermally-assisted magnetic recording head according to the first embodiment of the invention.
Figure 6:
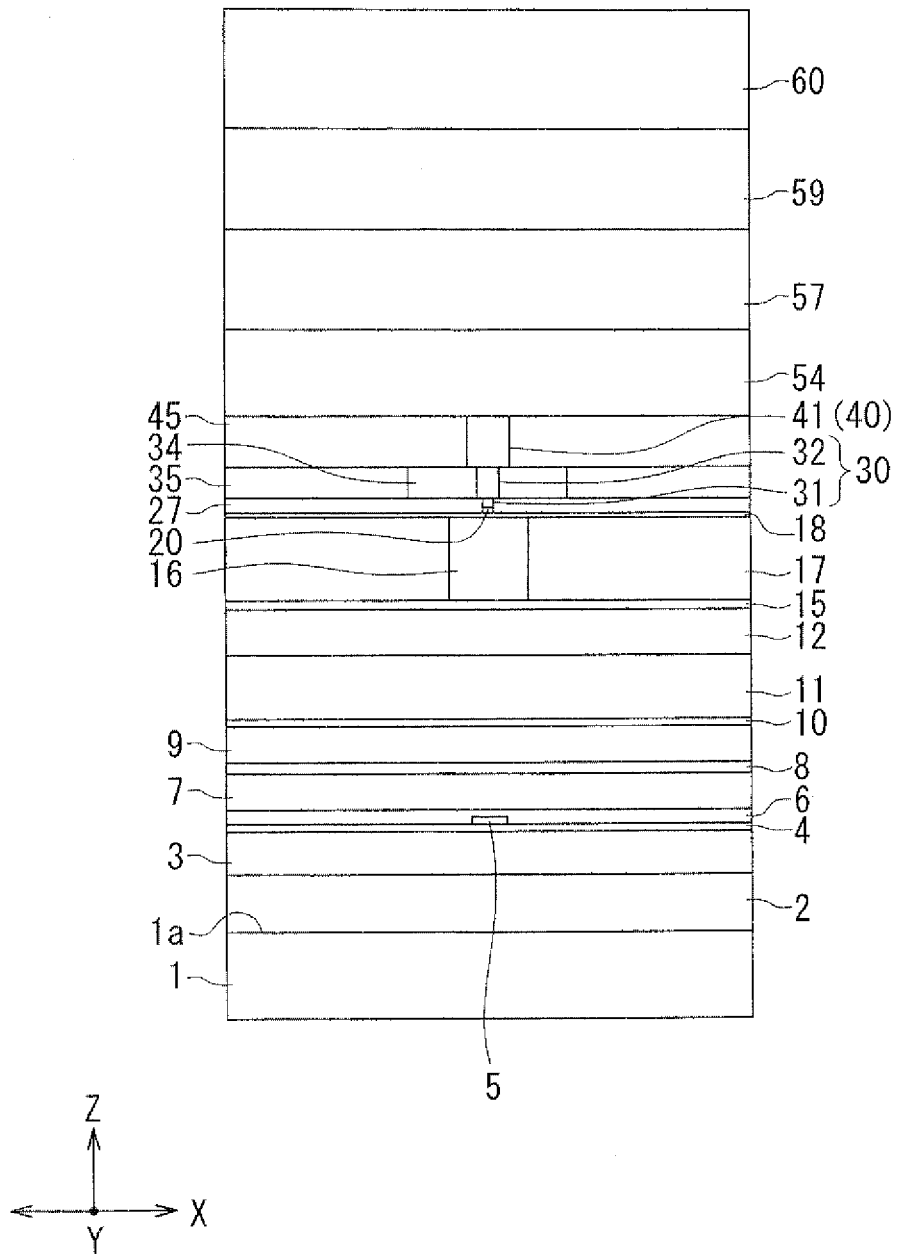
FIG. 6 is a front view showing the medium facing surface of the thermally-assisted magnetic recording head according to the first embodiment of the invention.
Figure 7:
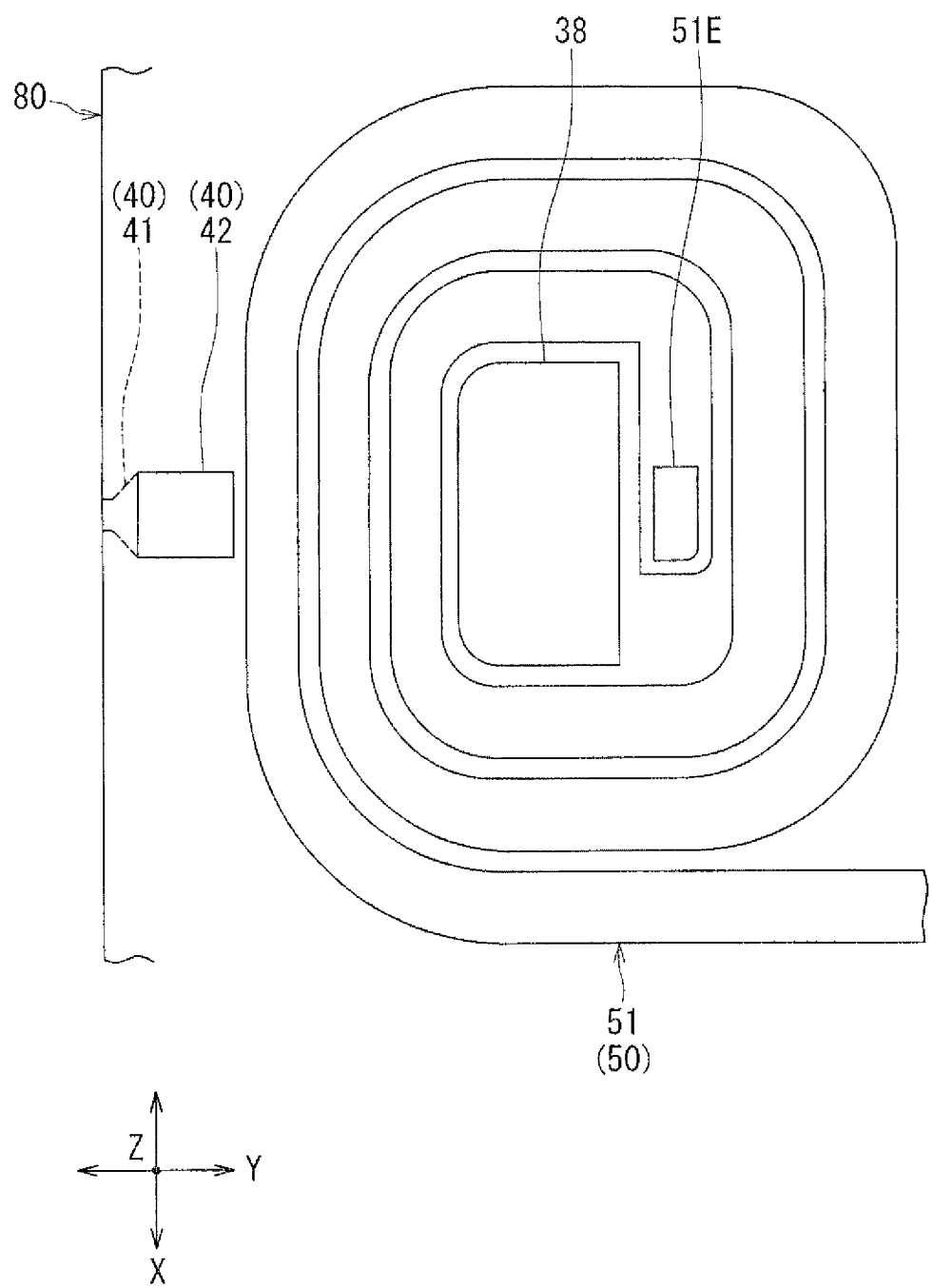
FIG. 7 is a plan view showing a first layer of a coil of the first embodiment of the invention.
Figure 8:
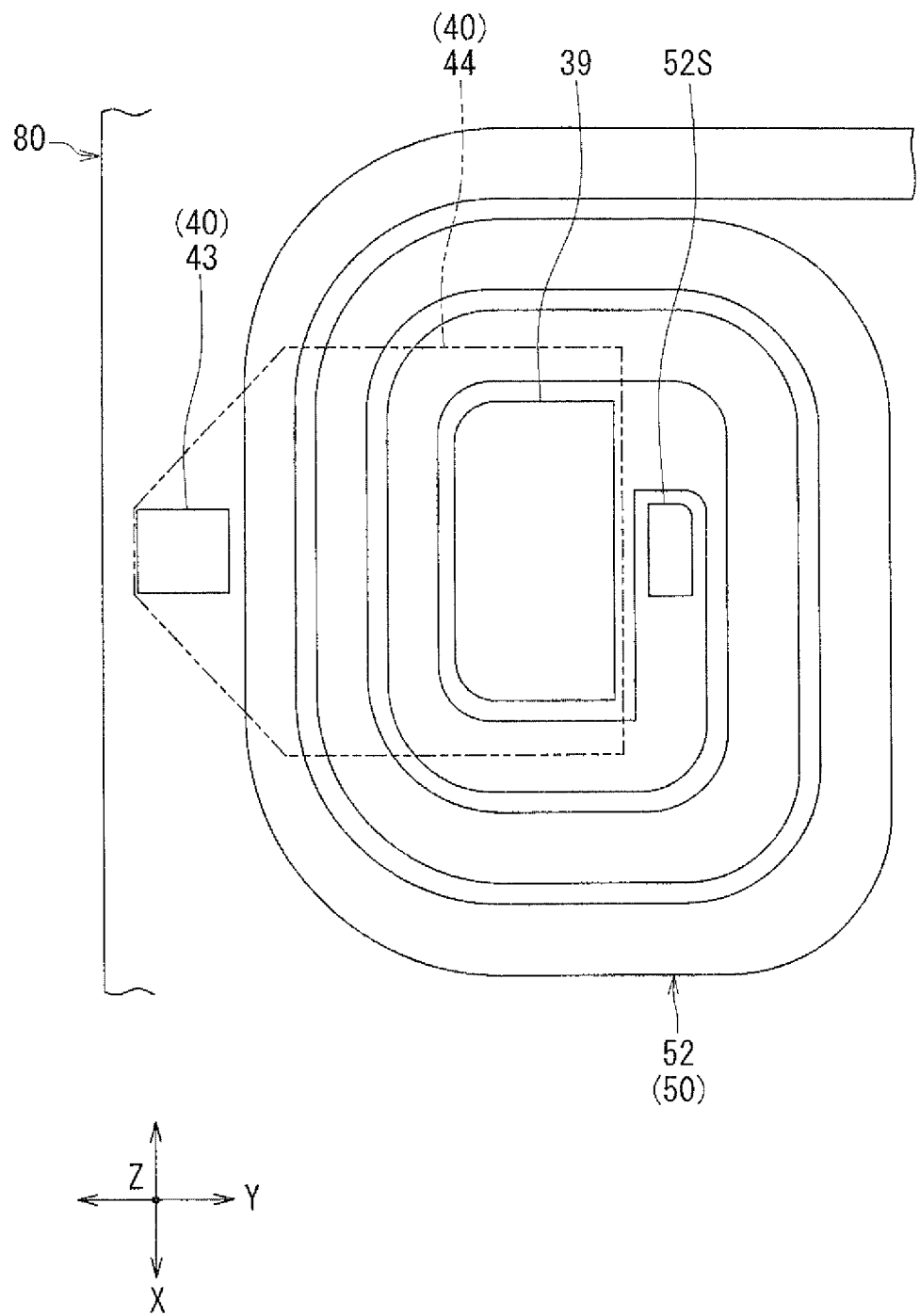
FIG. 8 is a plan view showing a second layer of the coil of the first embodiment of the invention.

Preferred embodiments of the present invention will now be described in detail with reference to the drawings. First, reference is made to FIG. 1 to FIG. 8 to describe the configuration of a thermally-assisted magnetic recording head according to a first embodiment of the invention. FIG. 1 is a perspective view showing the main part of the thermally-assisted magnetic recording head. FIG. 2 is an enlarged perspective view of a part of FIG. 1. FIG. 3 is a front view showing the main part of the thermally-assisted magnetic recording head. FIG. 4 is a cross-sectional view showing the main part of the thermally-assisted magnetic recording head. FIG. 5 is a cross-sectional view showing the configuration of the thermally-assisted magnetic recording head. FIG. 6 is a front view showing the medium facing surface of the thermally-assisted magnetic recording head. FIG. 7 is a plan view showing a first layer of a coil of the present embodiment. FIG. 8 is a plan view showing a second layer of the coil of the present embodiment.

The thermally-assisted magnetic recording head according to the present embodiment is intended for use in perpendicular magnetic recording, and is in the form of a slider configured to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 80 configured to face a recording medium 90. Here, X direction, Y direction, and Z direction will be defined as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 50 and a main pole 30. The coil 50 produces a magnetic field corresponding to data to be written on the recording medium 90. As shown in FIG. 1, FIG. 3 and FIG. 4, the main pole 30 has a front end face 30a located in the medium facing surface 80. The main pole 30 is configured to pass a magnetic flux corresponding to the magnetic field produced by the coil 50, and to produce from the front end face 30a a write magnetic field for writing data on the recording medium. The coil 50 is formed of a conductive material such as copper.

The write head unit further includes a shield 12 formed of a magnetic material, and a return path section R formed of a magnetic material. As shown in FIG. 5, the shield 12 has an end face 12a located in the medium facing surface 80. The return path section R connects the main pole 30 and the shield 12 to each other, and passes a magnetic flux corresponding to the magnetic field produced by the coil 50.

The return path section R includes a return pole layer 11, two coupling sections 13A and 13B, coupling layers 37, 38 and 39, and a first yoke portion 40. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The shield 12 is located on a first portion of the top surface of the return pole layer 11, the first portion being near the medium facing surface 80. The two coupling sections 13A and 13B are located on two second portions of the top surface of the return pole layer 11, the two second portions being located away from the medium facing surface 80. Each of the coupling sections 13A and 13B includes a first layer lying on the return pole layer 11, and a second and a third layer stacked in this order on the first layer. The first layer of the coupling section 13A and the first layer of the coupling section 13B are arranged to be adjacent in the track width direction (the X direction).

The write head unit further includes an insulating layer 14 lying on the non-illustrated insulating layer and a portion of the top surface of the return pole layer 11 other than the first and second portions. The first layers of the coupling sections 13A and 13B are embedded in the insulating layer 14. The insulating layer 14 is formed of alumina, for example.

The write head unit further includes a waveguide including a core 16 and a cladding, the core 16 allowing light to propagate therethrough, the cladding being provided around the core 16. As shown in FIG. 1 and FIG. 3 to FIG. 5 in particular, the core 16 has a front end face 16a facing toward the medium facing surface 80, an evanescent light generating surface 16b which is a top surface, a bottom surface 16c, and two side surfaces 16d and 16e. The front end face 16a may be located in the medium facing surface 80 or at a distance from the medium facing surface 80. FIG. 1 and FIG. 3 to FIG. 6 show an example in which the front end face 16a is located in the medium facing surface 80.

The cladding includes cladding layers 15, 17 and 18. The cladding layer 15 lies on the shield 12 and the insulating layer 14. The core 16 lies on the cladding layer 15. The cladding layer 17 lies on the cladding layer 15 and surrounds the core 16. The cladding layer 18 is disposed over the evanescent light generating surface 16b of the core 16 and the top surface of the cladding layer 17.

The core 16 is formed of a dielectric material that transmits laser light to be used for generating near-field light. The laser light emitted from a non-illustrated laser diode enters the core 16 and propagates through the core 16. The cladding layers 15, 17 and 18 are each formed of a dielectric material that has a refractive index lower than that of the core 16. For example, the core 16 may be formed of tantalum oxide such as $Ta_2O_5$ or silicon oxynitride (SiON), whereas the cladding layers 15, 17 and 18 may be formed of silicon oxide ($SiO_2$) or alumina.

The second layers of the coupling sections 13A and 13B are embedded in the cladding layers 15 and 17. The second layer of the coupling section 13A and the second layer of the coupling section 13B are located on opposite sides of the core 16 in the track width direction (the X direction) and spaced from the core 16.

The write head unit further includes a plasmon generator 20 disposed above the cladding layer 18 in the vicinity of the medium facing surface 80, and an adhesion layer 19 interposed between the cladding layer 18 and the plasmon generator 20. FIG. 5 and FIG. 6 omit the illustration of the adhesion layer 19. The plasmon generator 20 is intended for use to excite surface plasmons on the principle to be described later. The adhesion layer 19 is provided to prevent the plasmon generator 20 from peeling away from the cladding layer 18. The adhesion layer 19 may be formed of one of Zr, ZrN, Ru, Pt, Pd, Ti, Ta, Ni, W, Cr, NiCr, NiFe, Co, Cu, TiW, TiN, Mo, Hf, and Rh, for example. The adhesion layer 19 may have a thickness of 0.3 to 1 nm, for example. The adhesion layer 19 is not an essential component of the thermally-assisted magnetic recording head, and can be dispensed with. The plasmon generator 20 will be described in detail later.

The write head unit further includes a dielectric layer 24 lying on a portion of the plasmon generator 20 in the vicinity of the medium facing surface 80, and a nonmagnetic metal film 25 lying on another portion of the plasmon generator 20 and on the dielectric layer 24. FIG. 5 and FIG. 6 omit the illustration of the dielectric layer 24 and the nonmagnetic metal film 25. The dielectric layer 24 is formed of the same material as the cladding layers 15, 17 and 18, for example. The nonmagnetic metal film 25 has the function of preventing the material of the plasmon generator 20 from diffusing into the main pole 30, and thereby preventing deterioration of the magnetic properties of the main pole 30. The nonmagnetic metal film 25 is formed of Ru, Ta or Ti, for example.

In the present embodiment, the main pole 30 includes a first layer 31, and a second layer 32 stacked on the first layer 31. The first layer 31 lies on the nonmagnetic metal film 25. The plasmon generator 20 lies between the core 16 and the first layer 31. The write head unit further includes a surrounding layer 27 and a dielectric film 26. The surrounding layer 27 is formed of a dielectric material and provided around the plasmon generator 20, the dielectric layer 24, the nonmagnetic metal film 25 and the first layer 31. The dielectric film 26 is interposed between the surrounding layer 27 and each of the plasmon generator 20, the dielectric layer 24, the nonmagnetic metal film 25 and the first layer 31. FIG. 6 omits the illustration of the dielectric film 26. The dielectric film 26 and the surrounding layer 27 are formed of the same material as the cladding layers 15, 17 and 18, for example.

The second layer 32 lies on the first layer 31 and the surrounding layer 27. The write head unit further includes a heat sink 34 and a nonmagnetic metal film 33. The heat sink 34 is disposed above the plasmon generator 20 and the surrounding layer 27 and surrounds a portion of the first layer 31 and the second layer 32. The nonmagnetic metal film 33 is interposed between the heat sink 34 and each of the plasmon generator 20, the main pole 30 and the surrounding layer 27. FIG. 5 and FIG. 6 omit the illustration of the nonmagnetic metal film 33. The heat sink 34 has the function of dissipating heat generated at the plasmon generator 20 and heat transferred from the plasmon generator 20 to the main pole 30 outward from the plasmon generator 20 and the main pole 30. The heat sink 34 is formed of Au or Cu, for example. The nonmagnetic metal film 33 has the function of preventing the materials of the plasmon generator 20 and the heat sink 34 from diffusing into the main pole 30, and thereby preventing deterioration of the magnetic properties of the main pole 30. The nonmagnetic metal film 33 is formed of the same material as the nonmagnetic metal film 25, for example.

The write head unit further includes a dielectric layer 35 provided around the heat sink 34. The top surfaces of the second layer 32, the heat sink 34 and the dielectric layer 35 are even with each other. The dielectric layer 35 is formed of the same material as the cladding layers 15, 17 and 18, for example.

The third layers of the coupling sections 13A and 13B are embedded in the cladding layer 18, the surrounding layer 27 and the dielectric layer 35. The coupling layer 37 lies on the third layers of the coupling sections 13A and 13B and the dielectric layer 35.

The first yoke portion 40 includes a first layer 41, a second layer 42, a third layer 43 and a fourth layer 44. A portion of the first layer 41 lies on the main pole 30, and another portion of the first layer 41 lies above the heat sink 34. The first layer 41 has an end face located in the medium facing surface 80. The first layer 41 may include a narrow portion and a wide portion as shown in FIG. 7, the narrow portion having the aforementioned end face of the first layer 41 and an end opposite thereto, the wide portion being connected to the end of the narrow portion. The wide portion is greater than the narrow portion in width in the track width direction (the X direction). The width of the narrow portion in the track width direction is substantially constant regardless of distance from the medium facing surface 80. The width of the wide portion in the track width direction is equal to that of the narrow portion at the boundary between the narrow portion and the wide portion, and gradually increases with increasing distance from the medium facing surface 80, then becoming constant.

Figure 23A:
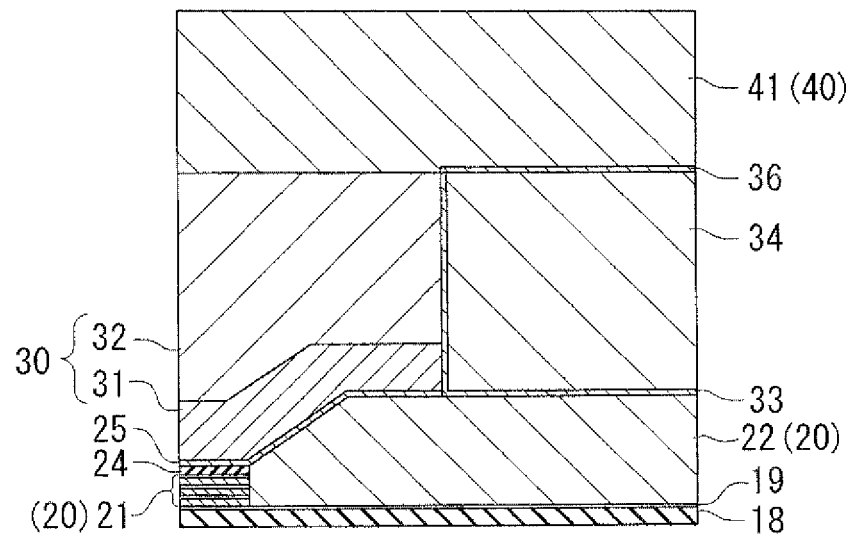
FIG. 23A and FIG. 23B are cross-sectional views showing a step that follows the step shown in FIG. 22A and FIG. 22B.
Figure 23B:
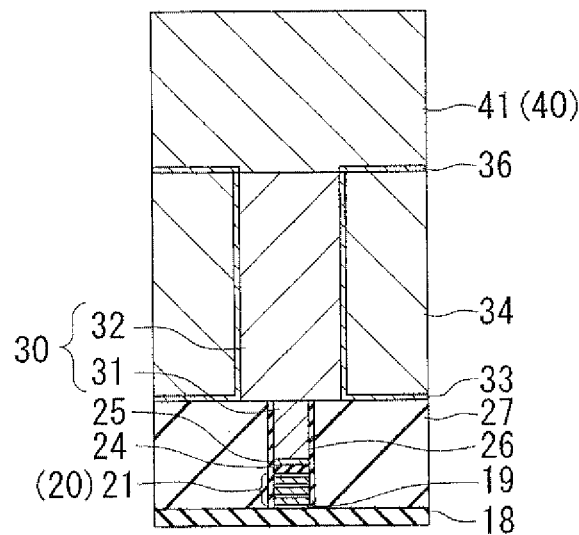

The write head unit further includes a nonmagnetic metal film 36 interposed between the heat sink 34 and the first layer 41, and a dielectric layer 45 provided around the first layer 41 and the coupling layer 37. The nonmagnetic metal film 36 is shown in FIG. 23A and FIG. 23B to be described later. The nonmagnetic metal film 36 has the function of preventing the material of the heat sink 34 from diffusing into the first layer 41. The nonmagnetic metal film 36 is formed of the same material as the nonmagnetic metal film 25, for example. The dielectric layer 45 is formed of the same material as the cladding layers 15, 17 and 18, for example.

The second layer 42 of the first yoke portion 40 lies on the first layer 41. The second layer 42 has an end face facing toward the medium facing surface 80 and located at a distance from the medium facing surface 80. The coupling layer 38 lies on the coupling layer 37.

The coil 50 includes a first layer 51 and a second layer 52. The write head unit further includes an insulating film 53, an insulating layer 54 and an insulating layer 55. The insulating film 53 is interposed between the first layer 51 of the coil 50 and each of the second layer 42 of the first yoke portion 40, the coupling layer 38 and the dielectric layer 45. The insulating layer 54 is disposed around the first layer 51 and the second layer 42 and in the space between adjacent turns of the first layer 51. The insulating layer 55 lies on the first layer 51, the insulating film 53 and the insulating layer 54. The insulating film 53 and the insulating layers 54 and 55 are formed of alumina, for example.

The third layer 43 of the first yoke portion 40 lies on the second layer 42. The third layer 43 has an end face facing toward the medium facing surface 80 and located at a distance from the medium facing surface 80. The coupling layer 39 lies on the coupling layer 38.

The write head unit further includes an insulating film 56, an insulating layer 57 and an insulating layer 58. The insulating film 56 is interposed between the second layer 52 of the coil 50 and each of the third layer 43 of the first yoke portion 40, the coupling layer 39 and the insulating layer 55. The insulating layer 57 is disposed around the second layer 52 and the third layer 43 and in the space between adjacent turns of the second layer 52. The insulating layer 58 lies on the second layer 52, the insulating film 56 and the insulating layer 57. The insulating film 56 and the insulating layers 57 and 58 are formed of alumina, for example.

The fourth layer 44 of the first yoke portion 40 lies on the third layer 43, the coupling layer 39 and the insulating layer 58. The fourth layer 44 has an end face facing toward the medium facing surface 80 and located at a distance from the medium facing surface 80. The write head unit further includes an insulating layer 59 disposed around the fourth layer 44. The insulating layer 59 is formed of alumina, for example.

The thermally-assisted magnetic recording head further includes a protective layer 60 disposed to cover the write head unit. The protective layer 60 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 50, the main pole 30, the waveguide, the plasmon generator 20, the shield 12, the return path section R, the dielectric layer 24, and the heat sink 34. The waveguide includes the core 16 and the cladding. The cladding includes the cladding layers 15, 17 and 18. The return path section R includes the return pole layer 11, the two coupling sections 13A and 13B, the coupling layers 37 to 39, and the first yoke portion 40. The dielectric layer 24 is provided between the main pole 30 and the plasmon generator 20.

The main pole 30 has the front end face 30a located in the medium facing surface 80. The shield 12 has the end face 12a located in the medium facing surface 80. The front end face 30a and the end face 12a are at locations different from each other in the direction of travel of the recording medium 90 (the Z direction). In the present embodiment, in particular, the end face 12a is located on the leading side, i.e., the rear side in the direction of travel of the recording medium 90, relative to the front end face 30a.

The main pole 30 is located on the front side in the direction of travel of the recording medium 90 relative to the core 16. The core 16 has the front end face 16a located in the medium facing surface 80. The front end face 16a lies between the front end face 30a of the main pole 30 and at least part of the end face 12a of the shield 12.

The shield 12 captures a disturbance magnetic field applied to the thermally-assisted magnetic recording head from the outside thereof. This makes it possible to prevent the disturbance magnetic field from being intensively captured into the main pole 30 and thereby causing erroneous writing on the recording medium 90. The shield 12 also has the function of capturing a magnetic flux that is produced from the front end face 30a of the main pole 30 and spreads in directions other than the direction perpendicular to the plane of the recording medium 90, and thereby preventing the magnetic flux from reaching the recording medium 90. It is thereby possible to increase the gradient of intensity of the write magnetic field. The shield 12 and the return path section R also have the function of allowing a magnetic flux that has been produced from the front end face 30a of the main pole 30 and has magnetized a portion of the recording medium 90 to flow back to the main pole 30.

The shape and location of the coil 50 will now be described in detail with reference to FIG. 7 and FIG. 8. As shown in FIG. 7, the first layer 51 of the coil 50 is wound approximately three times around the coupling layer 38. The first layer 51 includes a portion extending to pass between the second layer 42 of the first yoke portion 40 and the coupling layer 38. The first layer 51 has a coil connection 51E electrically connected to the second layer 52 of the coil 50.

As shown in FIG. 8, the second layer 52 is wound approximately three times around the coupling layer 39. The second layer 52 includes a portion extending to pass between the third layer 43 of the first yoke portion 40 and the coupling layer 39. The second layer 52 has a coil connection 52S electrically connected to the coil connection 51E of the first layer 51. The coil connection 52S penetrates the insulating layer 55 and the insulating film 56 (see FIG. 5) and is electrically connected to the coil connection 51E. In the example shown in FIG. 7 and FIG. 8, the first layer 51 and the second layer 52 are connected in series.

The plasmon generator 20 will now be described in detail with reference to FIG. 1 to FIG. 4. The plasmon generator 20 has a near-field light generating surface 20a located in the medium facing surface 80, a plasmon exciting section 20b which is a bottom surface, a top surface 20c, a rear end face 20d opposite to the near-field light generating surface 20a, and two side surfaces 20e and 20f. The plasmon exciting section 20b is located at a predetermined distance from the evanescent light generating surface 16b of the core 16 and faces the evanescent light generating surface 16b. The cladding layer 18 is interposed between the evanescent light generating surface 16b and the plasmon exciting section 20b. For example, the plasmon generator 20 is rectangular in cross section parallel to the medium facing surface 80. The near-field light generating surface 20a is located between the front end face 30a of the main pole 30 and the front end face 16a of the core 16. The near-field light generating surface 20a generates near-field light on the principle to be described later.

As shown in FIG. 2 and FIG. 4, the plasmon generator 20 includes a multilayer film section 21 and a metal section 22. The multilayer film section 21 has a front end face located in the medium facing surface 80, a rear end opposite to the front end face, a bottom surface, a top surface, and two side surfaces. The front end face of the multilayer film section 21 also serves as the near-field light generating surface 20a of the plasmon generator 20. The dielectric layer 24 lies on the top surface of the multilayer film section 21.

The metal section 22 is located on a side of the multilayer film section 21 farther from the near-field light generating surface 20a. The metal section 22 has a front end connected to the rear end of the multilayer film section 21, a rear end face opposite to the front end, a bottom surface, a top surface, and two side surfaces. The top surface of the metal section 22 includes an inclined portion and a flat portion, the inclined portion being located closer to the multilayer film section 21 than is the flat portion. The inclined portion has a first end closest to the multilayer film section 21, and a second end opposite thereto. The inclined portion is inclined such that its second end is located on the front side in the direction of travel of the recording medium 90 relative to its first end. The flat portion extends in a direction substantially perpendicular to the medium facing surface 80.

The width of the multilayer film section 21 in the track width direction (X direction) may be constant regardless of distance from the medium facing surface 80 or decrease with decreasing distance to the medium facing surface 80. The width of the metal section 22 is equal to the width of the multilayer film section 21 at the boundary between the metal section 22 and the multilayer film section 21, and increases with increasing distance from the multilayer film section 21.

The width of the near-field light generating surface 20a in the track width direction (the X direction) is defined by the width of the multilayer film section 21 in the medium facing surface 80. The width of the near-field light generating surface 20a falls within the range of 5 to 40 nm, for example.

As shown in FIG. 2, the multilayer film section 21 includes at least a first metal layer M1, a second metal layer M2, and an intermediate layer N1. The intermediate layer N1 is interposed between the first metal layer M1 and the second metal layer M2. Each of the first metal layer M1, the second metal layer M2 and the intermediate layer N1 has an end located in the near-field light generating surface 20a. Each of the first and second metal layers M1 and M2 is formed of a metal material. The intermediate layer N1 may be formed of either a dielectric material or a metal material that is different from the metal material used to form the first metal layer M1 and the metal material used to form the second metal layer M2. Hereinafter, the metal material used to form the first metal layer M1 and the metal material used to form the second metal layer M2 will each be referred to as the metal layer material, and the material used to form the intermediate layer N1 will be referred to as the intermediate layer material. The intermediate layer material is higher in Vickers hardness than the metal layer material. Where the intermediate layer material is a metal material, the metal layer material is preferably higher in electrical conductivity than the intermediate layer material.

In the example shown in FIG. 2, the intermediate layer N1 and the second metal layer M2 are stacked in this order on the first metal layer M1. In this example, the multilayer film section 21 further includes a second intermediate layer N2, a third metal layer M3, and a protective layer N3 stacked in this order on the second metal layer M2. Each of the second intermediate layer N2, the third metal layer M3 and the protective layer N3 has an end located in the near-field light generating surface 20a. The metal layer M3 is formed of the metal layer material. Each of the intermediate layer N2 and the protective layer N3 is formed of the intermediate layer material. The protective layer N3 has the function of protecting the plasmon generator 20 and the function of enhancing adhesion of the dielectric layer 24 to the plasmon generator 20.

Examples of the metal layer material include Au, Ag, Al and Cu. Examples of metal materials selectable as the intermediate layer material include Zr, ZrN, Ru, Pt, Pd, Ti, Ta, Ni, W, Cr, NiCr, NiFe, Co, Cu, TiW, TiN, Mo, Hf, and Rh. Examples of dielectric materials selectable as the intermediate layer material include $SiO_2$, alumina, MgO, amorphous SiC, tantalum oxide, SiON, $ZrO_x$, $HfO_x$, and $NbO_x$, where "x" in $ZrO_x$, $HfO_x$ and $NbO_x$ represents any number greater than zero. When the metal layer material is Cu, the intermediate layer material is other than Cu.

As far as the requirement that the intermediate layer material be higher in Vickers hardness than the metal layer material is satisfied, the materials used to form the metal layers M1 to M3 may all be the same or may be different from each other, or two of them may be the same. Likewise, the materials used to form the intermediate layers N1 and N2 and the protective layer N3 may all be the same or may be different from each other, or two of them may be the same.

The intermediate layers N1 and N2 and the protective layer N3 may be smaller in thickness than the metal layers M1 to M3. The thickness of each of the metal layers M1 to M3 preferably falls within the range of 5 to 25 nm, and the thickness of each of the intermediate layers N1 and N2 and the protective layer N3 preferably falls within the range of 0.5 to 2 nm.

The metal section 22 is formed of a metal material. The metal material used to form the metal section 22 may be one of Au, Ag, Al and Cu, for example.

The configuration of the plasmon generator 20 is not limited to the above-described example. For example, the plasmon generator 20 may include a single layer portion formed of a single metal material, in place of the multilayer film section 21. The single layer portion may have the same shape as the multilayer film section 21. The metal material used to form the single layer portion may be one of Au, Ag, Al and Cu, for example. The metal material used to form the single layer portion may be the same as or different from the metal material used to form the metal section 22. Further, the plasmon generator 20 may be composed entirely of a multilayer film formed by alternately stacking metal layers formed of the metal layer material and intermediate layers formed of the intermediate layer material.

The main pole 30 and the locations of the main pole 30 and the plasmon generator 20 relative to each other will now be described in detail with reference to FIG. 1 to FIG. 4. As shown in FIG. 1, FIG. 3 and FIG. 4, the front end face 30a of the main pole 30 and the near-field light generating surface 20a of the plasmon generator 20 are at locations different from each other in the direction of travel of the recording medium 90 (the Z direction). In the present embodiment, the front end face 30a is located on the trailing side, i.e., the front side in the direction of travel of the recording medium 90, relative to the near-field light generating surface 20a.

As shown in FIG. 4, the top surface 20c of the plasmon generator 20 includes a first region 20c1, and a second region 20c2 located farther from the medium facing surface 80 than the first region 20c1.

The front end face 30a of the main pole 30 includes a first end face portion 31a, and a second end face portion 32a contiguous with the first end face portion 31a. The second end face portion 32a is located farther from the near-field light generating surface 20a than is the first end face portion 31a, and has a greater width in the track width direction than the first end face portion 31a. In the present embodiment, the second end face portion 32a is located on the front side in the direction of travel of the recording medium 90 relative to the first end face portion 31a.

As shown in FIG. 3, the first end face portion 31a has a first edge E1 and a second edge E2 opposite to each other in the track width direction. The near-field light generating surface 20a has a third edge E3 and a fourth edge E4 opposite to each other in the track width direction. Now, let us assume a first imaginary straight line L1 and a second imaginary straight line L2 as shown in FIG. 3. The first imaginary straight line L1 extends in the Z direction. The second imaginary straight line L2 is parallel to the first imaginary straight line L1. The first edge E1 and the third edge E3 are located on the first imaginary straight line L1. The second edge E2 and the fourth edge E4 are located on the second imaginary straight line L2.

The distance between the first edge E1 and the second edge E2 is equal to the width of the first end face portion 31a in the track width direction. The distance between the third edge E3 and the fourth edge E4 is equal to the width of the near-field light generating surface 20a in the track width direction. Consequently, the width of the first end face portion 31a is equal to the width of the near-field light generating surface 20a.

Thus, in the present embodiment, the first end face portion 31a and the near-field light generating surface 20a are equal in width and are precisely aligned with each other such that the first edge E1 and the third edge E3 are located on the first imaginary straight line L1 and the second edge E2 and the fourth edge E4 are located on the second imaginary straight line L2.

As previously mentioned, the main pole 30 includes the first layer 31 and the second layer 32. As shown in FIG. 2 to FIG. 4, the first layer 31 has the first end face portion 31a mentioned previously, and further has a first rear end face portion 31b farthest from the medium facing surface 80, and a first side surface 31c and a second side surface 31d located at opposite ends of the first layer 31 in the track width direction. As shown in FIG. 1, FIG. 3 and FIG. 4, the second layer 32 has the second end face portion 32a mentioned previously, and further has a second rear end face portion 32b farthest from the medium facing surface 80, and a third side surface 32c and a fourth side surface 32d located at opposite ends of the second layer 32 in the track width direction. In the present embodiment, as shown in FIG. 4, the first rear end face portion 31b and the second rear end face portion 32b are located at the same distance from the medium facing surface 80.

As shown in FIG. 1 and FIG. 2, the first layer 31 may include a first narrow portion and a first wide portion, the first narrow portion having the first end face portion 31a and an end opposite thereto, the first wide portion being connected to the end of the first narrow portion. The first wide portion is greater than the first narrow portion in width in the track width direction (the X direction). The width of the first narrow portion in the track width direction is substantially constant regardless of distance from the medium facing surface 80. The width of the first wide portion in the track width direction is equal to that of the first narrow portion at the boundary between the first narrow portion and the first wide portion, and increases with increasing distance from the medium facing surface 80. The first layer 31 need not necessarily include the first narrow portion. In such a case, the first wide portion has the first end face portion 31a.

As shown in FIG. 1, the second layer 32 may include a second narrow portion and a second wide portion, the second narrow portion having the second end face portion 32a and an end opposite thereto, the second wide portion being connected to the end of the second narrow portion. The second wide portion is greater than the second narrow portion in width in the track width direction (the X direction). The width of the second narrow portion in the track width direction is substantially constant regardless of distance from the medium facing surface 80. The width of the second wide portion in the track width direction is equal to that of the second narrow portion at the boundary between the second narrow portion and the second wide portion, and gradually increases with increasing distance from the medium facing surface 80, then becoming constant. The second layer 32 need not necessarily include the second narrow portion. In such a case, the second wide portion has the second end face portion 32a.

As shown in FIG. 2 and FIG. 4, the first layer 31 further has a top surface 31e and a bottom surface 31f. As shown in FIG. 4, the bottom surface 31f is opposed to the first region 20c1 of the top surface 20c of the plasmon generator 20. The top surface 31e includes a first flat portion 31e1, an inclined portion 31e2 and a second flat portion 31e3 arranged in this order, the first flat portion 31e1 being closest to the medium facing surface 80. The inclined portion 31e2 has a first end connected to the first flat portion 31e1 and a second end connected to the second flat portion 31e3. The inclined portion 31e2 is inclined such that its second end is located on the front side in the direction of travel of the recording medium 90 relative to its first end. The first and second flat portions 31e1 and 31e3 extend in a direction substantially perpendicular to the medium facing surface 80.

The distance between the bottom surface 31f of the first layer 31 and the evanescent light generating surface 16b of the core 16 increases with increasing distance from the medium facing surface 80. According to the present embodiment, this configuration makes it possible to prevent the light propagating through the core 16 from being absorbed in part by the main pole 30 and to prevent the surface plasmons excited on the plasmon exciting section 20b from being absorbed in part by the main pole 30.

The heat sink 34 will now be described with reference to FIG. 3 and FIG. 4. The heat sink 34 has an outer surface including a first to a fifth portion opposed to the plasmon generator 20 and the first layer 31 and the second layer 32 of the main pole 30, as described below. The first portion is opposed to the second region 20c2 of the top surface 20c of the plasmon generator 20. The second portion is opposed to the first rear end face portion 31b of the first layer 31. The third portion is opposed to the second rear end face portion 32b of the second layer 32. The fourth portion is opposed to at least part of the third side surface 32c of the second layer 32. The fifth portion is opposed to at least part of the fourth side surface 32d of the second layer 32. FIG. 3 shows an example in which the fourth portion is opposed to the entire third side surface 32c while the fifth portion is opposed to the entire fourth side surface 32d. The nonmagnetic metal film 33 is interposed between the first to the fifth portion of the outer surface of the heat sink 34 and the plasmon generator 20, the first layer 31 and the second layer 32.

Now, the principle of generation of near-field light in the present embodiment and the principle of thermally-assisted magnetic recording using near-field light will be described in detail. Laser light emitted from a laser diode (not illustrated) enters the core 16. As shown in FIG. 5, the laser light 150 propagates through the core 16 toward the medium facing surface 80, and reaches the vicinity of the plasmon generator 20. The evanescent light generating surface 16b of the core 16 generates evanescent light based on the laser light 150 propagating through the core 16. More specifically, the laser light 150 is totally reflected at the evanescent light generating surface 16b, and the evanescent light generating surface 16b thereby generates evanescent light that permeates into the cladding layer 18. In the plasmon generator 20, surface plasmons are excited on the plasmon exciting section 20b through coupling with the aforementioned evanescent light. The surface plasmons propagate to the near-field light generating surface 20a, and the near-field light generating surface 20a generates near-field light based on the surface plasmons.

The near-field light generated from the near-field light generating surface 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 30 for data writing.

The specific functions and effects of the thermally-assisted magnetic recording head according to the present embodiment will now be described. On the recording medium 90, a spot of near-field light is formed and a thermal spot is generated by the spot of near-field light. The thermal spot size on the recording medium 90 is larger than the light spot size on the recording medium 90 and than the width of the near-field light generating surface 20a. On the other hand, of the first and second end face portions 31a and 32a of the front end face 30a of the main pole 30, the first end face portion 31a is located closer to the near-field light generating surface 20a than is the second end face portion 32a. The first end face portion 31a has a width equal to that of the near-field light generating surface 20a. In general, the spread of the magnetic field generated from the first end face portion 31a is smaller than the spread of heat on the recording medium 90. Thus, in the present embodiment, track width depends on the width of the first end face portion 31a. Further, because the spread of the magnetic field generated from the first end face portion 31a is smaller than the spread of heat on the recording medium 90 as mentioned above, the present embodiment is able to achieve a smaller track width and accordingly, a higher recording density when compared with the approach of reducing the light spot size.

The front end face 30a of the main pole 30 includes the second end face portion 32a which has a greater width in the track width direction than the first end face portion 31a. According to the present embodiment, this configuration makes it possible for the main pole 30 to pass a larger amount of magnetic flux than in the case where the front end face 30a consists only of the first end face portion 31a.

Consequently, the present embodiment makes it possible to provide a reduced track width and produce a write magnetic field of sufficient magnitude from the main pole 30.

A method of manufacturing the thermally-assisted magnetic recording head according to the present embodiment will now be described. The method of manufacturing the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The method of manufacturing the thermally-assisted magnetic recording head according to the present embodiment will be described in more detail below with attention focused on a single thermally-assisted magnetic recording head. The method of manufacturing the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the shield 12 and the first layers of the coupling sections 13A and 13B are formed on the return pole layer 11. Then, the insulating layer 14 is formed over the entire top surface of the stack. The insulating layer 14 is then polished by, for example, CMP, until the shield 12 and the first layers of the coupling sections 13A and 13B are exposed.

Next, the cladding layer 15 is formed over the entire top surface of the stack. The cladding layer 15 is then selectively etched to form therein two openings for exposing the top surfaces of the first layers of the coupling sections 13A and 13B. Then, the second layers of the coupling sections 13A and 13B are formed on the first layers of the coupling sections 13A and 13B, respectively. The core 16 is then formed on the cladding layer 15. The cladding layer 17 is then formed over the entire top surface of the stack. The cladding layer 17 is then polished by, for example, CMP, until the core 16 and the second layers of the coupling sections 13A and 13B are exposed. Then, the cladding layer 18 is formed over the entire top surface of the stack.

Reference is now made to FIG. 9A through FIG. 23B to describe steps to be performed after the formation of the cladding layer 18 up to the formation of the coupling layer 37, the first layer 41 of the first yoke portion 40 and the dielectric layer 45. FIG. 9A through FIG. 23B each show a stack of layers formed in the process of manufacturing the thermally-assisted magnetic recording head. FIG. 9A through FIG. 23B omit the illustration of portions located below the cladding layer 18. FIG. nA (n is an integer between 9 and 23 inclusive) shows a cross section that intersects the front end face 30a of the main pole 30 and that is perpendicular to the medium facing surface 80 and to the top surface 1a of the substrate 1. FIG. nB shows a cross section of the stack taken at the location at which the medium facing surface 80 is to be formed.

Figure 9A:
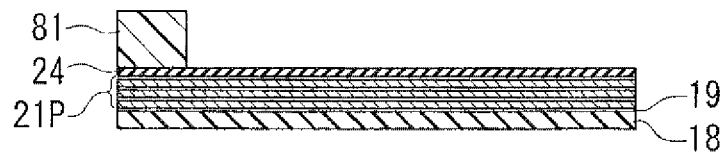
FIG. 9A and FIG. 9B are cross-sectional views showing a step of a method of manufacturing the thermally-assisted magnetic recording head according to the first embodiment of the invention.
Figure 9B:
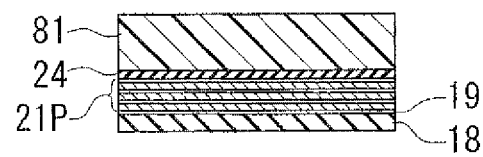

FIG. 9A and FIG. 9B show a step that follows the formation of the cladding layer 18. In this step, first, the adhesion layer 19 is formed on the cladding layer 18 by sputtering, for example. Then, a plurality of films that will later become the layers constituting the multilayer film section 21 of the plasmon generator 20 are formed in succession on the adhesion layer 19 by sputtering, for example. An initial multilayer film section 21P constituted by these plurality of films is thereby formed.

Next, the dielectric layer 24 is formed on the initial multilayer film section 21P. A photoresist mask 81 for defining the location of the rear end of the multilayer film section 21 is then formed on the dielectric layer 24. The photoresist mask 81 is formed by patterning a photoresist layer by photolithography. Other photoresist masks to be used in later steps will be formed in the same manner as the photoresist mask 81.

Figure 10A:
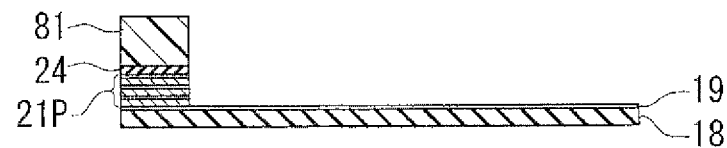
FIG. 10A and FIG. 10B are cross-sectional views showing a step that follows the step shown in FIG. 9A and FIG. 9B.
Figure 10B:
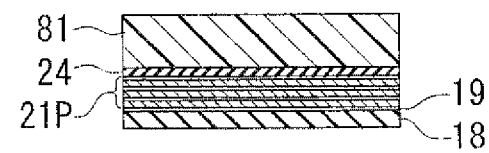

FIG. 10A and FIG. 10B show the next step. In this step, first, the initial multilayer film section 21P is etched by, for example, reactive ion etching (hereinafter referred to as RIE) or ion beam etching (hereinafter referred to as IBE), using the photoresist mask 81. The photoresist mask 81 is then removed.

Figure 11A:
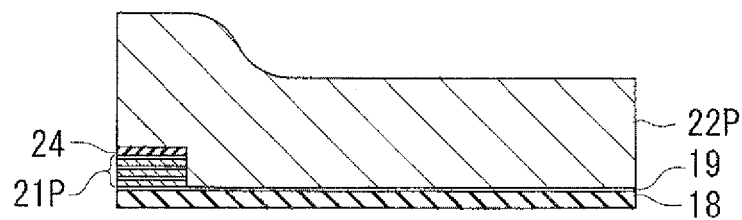
FIG. 11A and FIG. 11B are cross-sectional views showing a step that follows the step shown in FIG. 10A and FIG. 10B.
Figure 11B:
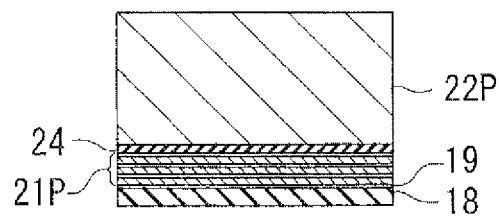

FIG. 11A and FIG. 11B show the next step. In this step, an initial metal section 22P, which will later become the metal section 22 of the plasmon generator 20, is formed on the adhesion layer 19 and the initial multilayer film section 21P by sputtering, for example. The initial metal section 22P may be formed while heating the stack to a temperature in the range of 300° C. to 400° C. This makes it possible to prevent the metal section 22 of the plasmon generator 20 from being deformed by heat generated by the plasmon generator 20 during use of the thermally-assisted magnetic recording head.

Figure 12A:
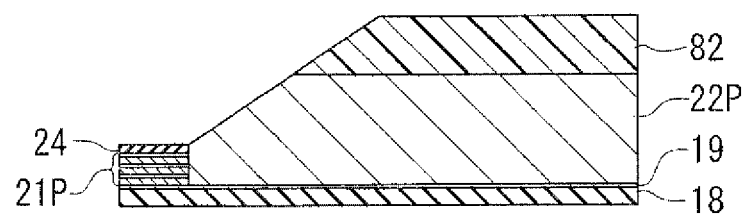
FIG. 12A and FIG. 12B are cross-sectional views showing a step that follows the step shown in FIG. 11A and FIG. 11B.
Figure 12B:
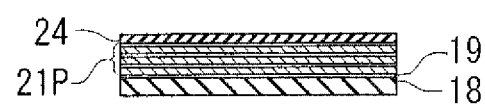

FIG. 12A and FIG. 12B show the next step. In this step, first, a photoresist mask 82 is formed on the initial metal section 22P at a location apart from the location at which the medium facing surface 80 is to be formed. The photoresist mask 82 covers only part of the portion of the initial metal section 22P lying on the adhesion layer 19. Next, the initial metal section 22P is taper-etched by, for example, RIE or IBE, using the photoresist mask 82 so as to provide the initial metal section 22P with an inclined surface. This etching continues until the dielectric layer 24 is exposed. The inclined surface includes a portion that will later become the inclined portion of the top surface of the metal section 22. The photoresist mask 82 is then removed. An initial plasmon generator constituted by the initial multilayer film section 21P and the initial metal section 22P is formed through the series of steps shown in FIG. 9A to FIG. 12B.

Figure 13A:
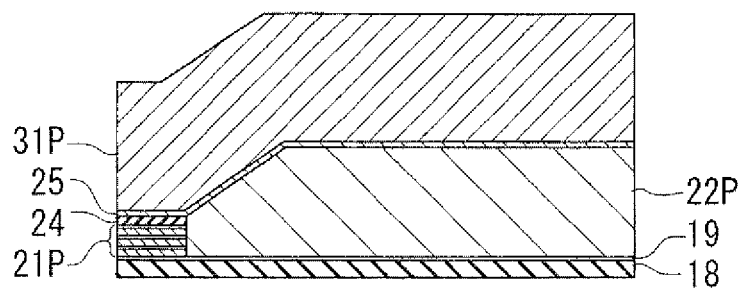
FIG. 13A and FIG. 13B are cross-sectional views showing a step that follows the step shown in FIG. 12A and FIG. 12B.
Figure 13B:
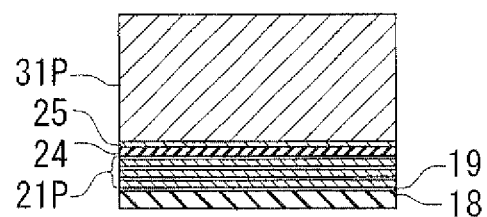

FIG. 13A and FIG. 13B show the next step. In this step, first, the nonmagnetic metal film 25 is formed on the initial metal section 22P and the dielectric layer 24 by sputtering, for example. Next, a first magnetic layer 31P for use to form the first layer 31 of the main pole 30 is formed on the nonmagnetic metal film 25 by sputtering, for example. The first magnetic layer 31P is formed such that its top surface is higher in level than the second flat portion 31e3 (see FIG. 4) of the top surface 31e of the first layer 31 to be formed later. The first magnetic layer 31P is larger in planar shape (the shape as viewed from above) than the first layer 31.

Figure 14A:
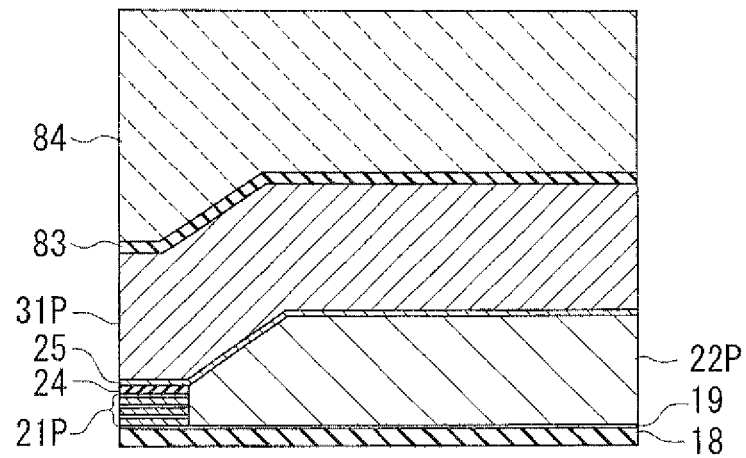
FIG. 14A and FIG. 14B are cross-sectional views showing a step that follows the step shown in FIG. 13A and FIG. 13B.
Figure 14B:
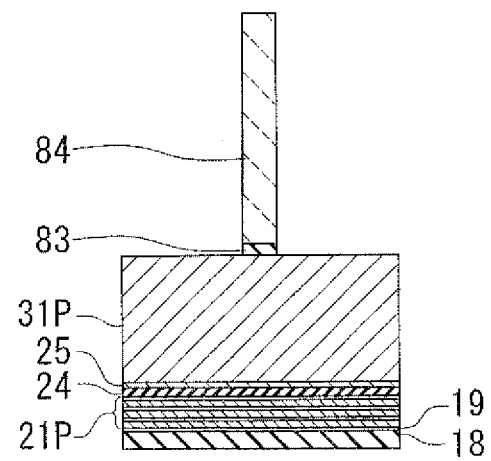

FIG. 14A and FIG. 14B show the next step. In this step, a first mask layer 83 and a second mask layer 84 are formed in this order on the first magnetic layer 31P. The first mask layer 83 is formed of alumina, for example. The second mask layer 84 is formed of carbon, for example. The first and second mask layers 83 and 84 are shaped to correspond to the planar shape of the plasmon generator 20.

Figure 15A:
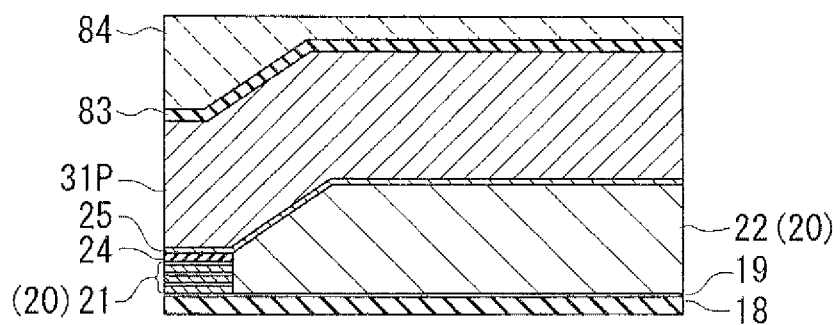
FIG. 15A and FIG. 15B are cross-sectional views showing a step that follows the step shown in FIG. 14A and FIG. 14B.
Figure 15B:
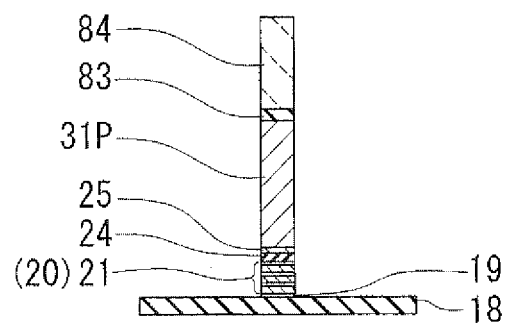

FIG. 15A and FIG. 15B show the next step. In this step, the first magnetic layer 31P and the initial plasmon generator are etched by, for example, RIE or IBE in the following manner and thereby patterned. First, the first magnetic layer 31P is etched using the first and second mask layers 83 and 84 as an etching mask, and subsequently, the nonmagnetic metal film 25, the dielectric layer 24, the initial plasmon generator and the adhesion layer 19 are etched using the first and second mask layers 83 and 84 and the etched first magnetic layer 31P as an etching mask. The etched first magnetic layer 31P has a side surface including the first side surface 31c of the first layer 31 and a side surface including the second side surface 31d of the first layer 31. The etching makes the initial multilayer film section 21P and the initial metal section 22P into the multilayer film section 21 and the metal section 22, respectively. In this way, the etching makes the initial plasmon generator into the plasmon generator 20.

Figure 16A:
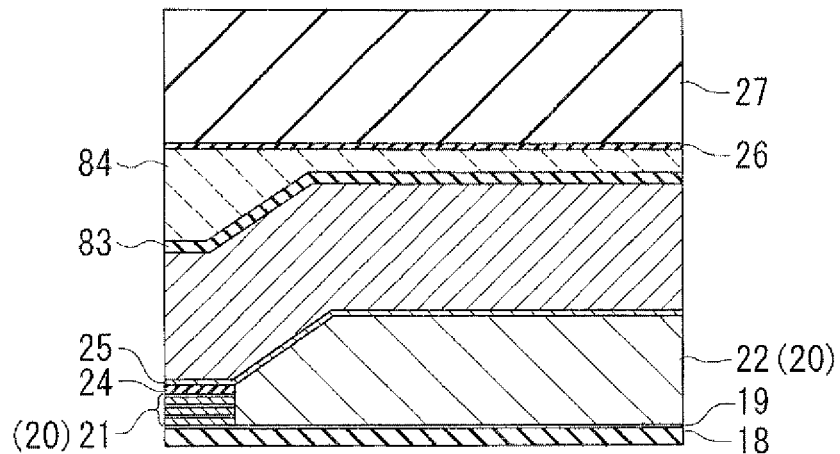
FIG. 16A and FIG. 16B are cross-sectional views showing a step that follows the step shown in FIG. 15A and FIG. 15B.
Figure 16B:
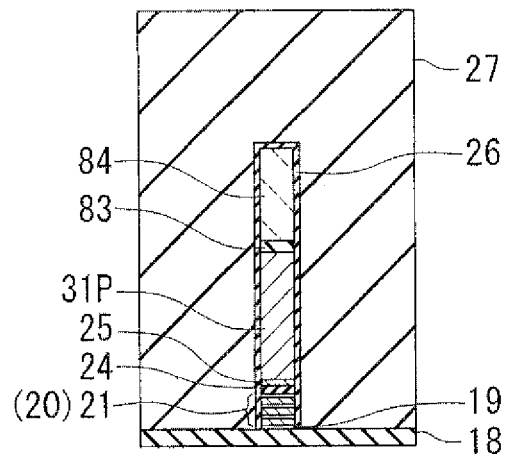

FIG. 16A and FIG. 16B show the next step. In this step, first, the dielectric film 26 is formed to cover the adhesion layer 19, the plasmon generator 20, the dielectric layer 24, the nonmagnetic metal film 25, the first magnetic layer 31P, the first mask layer 83 and the second mask layer 84. Then, the surrounding layer 27 is formed over the entire top surface of the stack.

Figure 17A:
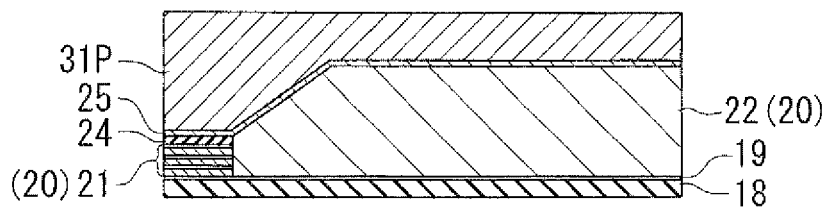
FIG. 17A and FIG. 17B are cross-sectional views showing a step that follows the step shown in FIG. 16A and FIG. 16B.
Figure 17B:
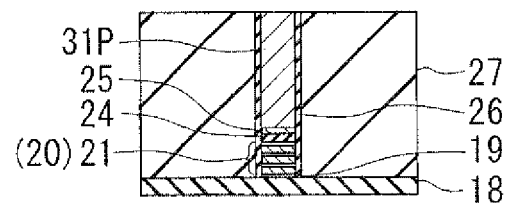

FIG. 17A and FIG. 17B show the next step. In this step, the first magnetic layer 31P, the dielectric film 26, the surrounding layer 27, the first mask layer 83, and the second mask layer 84 are polished by, for example, CMP, until the level of the second flat portion 31e3 of the top surface 31e of the first layer 31 to be formed later is reached.

Figure 18A:
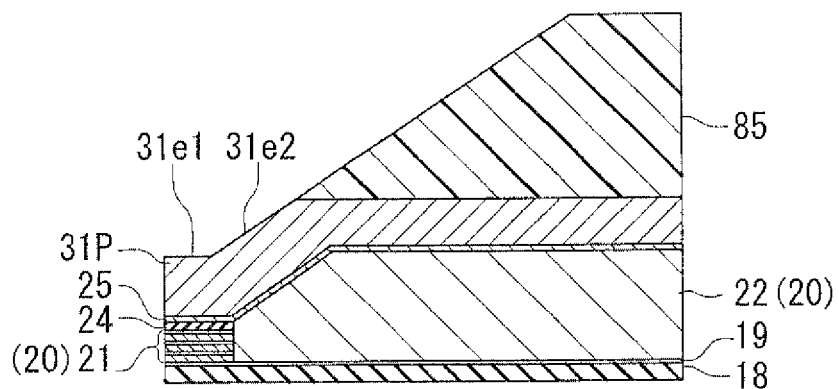
FIG. 18A and FIG. 18B are cross-sectional views showing a step that follows the step shown in FIG. 17A and FIG. 17B.
Figure 18B:
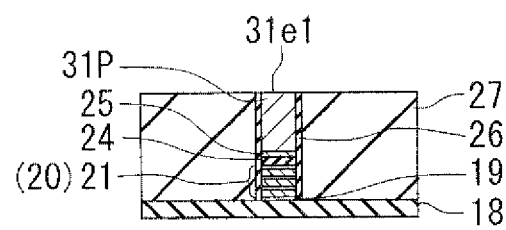

FIG. 18A and FIG. 18B show the next step. In this step, first, a photoresist mask 85 is formed on the first magnetic layer 31P at a location apart from the location at which the medium facing surface 80 is to be formed. Then, respective portions of the dielectric film 26, the surrounding layer 27 and the first magnetic layer 31P are etched by, for example, RIE or IBE using the photoresist mask 85 so as to provide the first magnetic layer 31P with the first flat portion 31e1 and the inclined portion 31e2 of the top surface 31e of the first layer 31. The photoresist mask 85 is then removed.

Figure 19A:
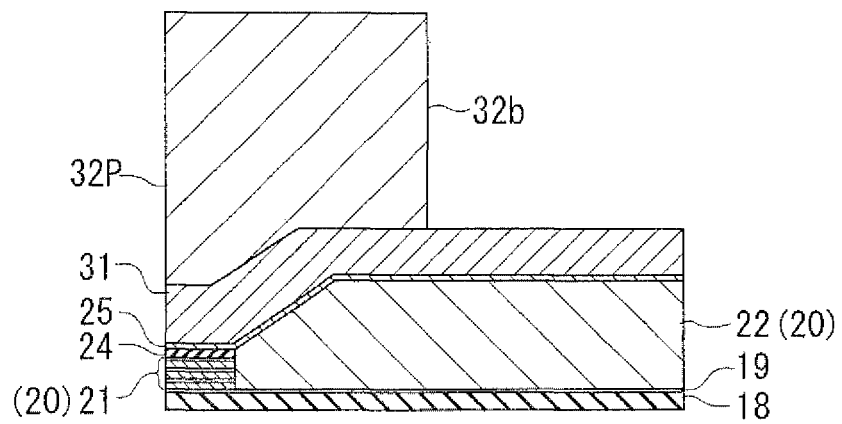
FIG. 19A and FIG. 19B are cross-sectional views showing a step that follows the step shown in FIG. 18A and FIG. 18B.
Figure 19B:
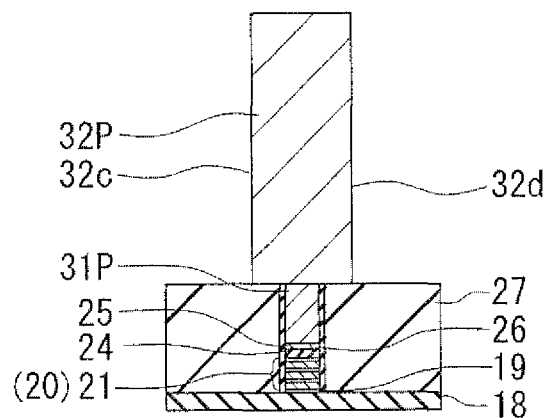

FIG. 19A and FIG. 19B show the next step. In this step, first, the cladding layer 18 and the surrounding layer 27 are selectively etched to form therein two openings for exposing the top surfaces of the second layers of the coupling sections 13A and 13B (see FIG. 5). Then, the third layers of the coupling sections 13A and 13B are formed on the second layers of the coupling sections 13A and 13B, respectively.

Further, a second magnetic layer 32P for use to form the second layer 32 of the main pole 30 is formed on the surrounding layer 27 and the first magnetic layer 31P. The third layers of the coupling sections 13A and 13B and the second magnetic layer 32P are formed such that their top surfaces are higher in level than the top surface of the second layer 32 to be formed later. The second magnetic layer 32P has a planar shape corresponding to that of the second layer 32. The second magnetic layer 32P has a rear end face including the second rear end face portion 32b of the second layer 32, a side surface including the third side surface 32c of the second layer 32, and a side surface including the fourth side surface 32d of the second layer 32.

Figure 20A:
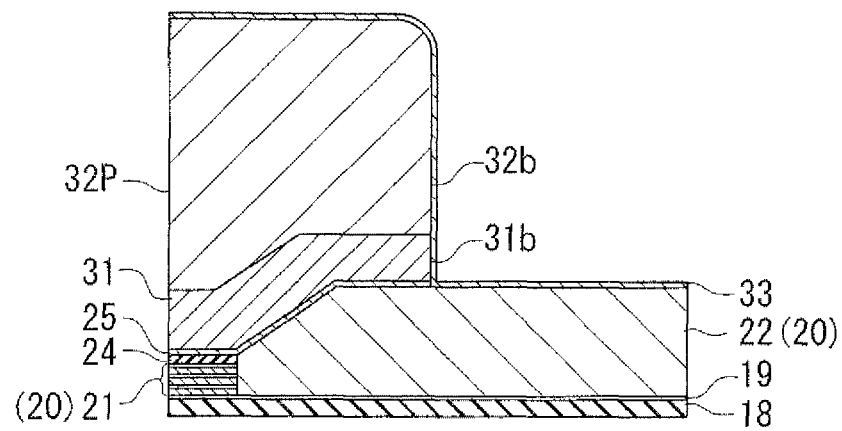
FIG. 20A and FIG. 20B are cross-sectional views showing a step that follows the step shown in FIG. 19A and FIG. 19B.
Figure 20B:
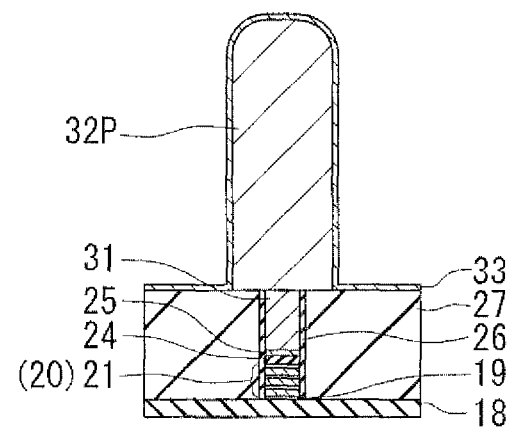

FIG. 20A and FIG. 20B show the next step. In this step, first, the first magnetic layer 31P is etched by, for example, IBE, using the second magnetic layer 32P as an etching mask. This etching provides the first magnetic layer 31P with the first rear end face portion 31b and thereby makes the first magnetic layer 31P into the first layer 31. Next, the nonmagnetic metal film 33 is formed to cover the metal section 22 of the plasmon generator 20, the surrounding layer 27, the first layer 31 and the second magnetic layer 32P.

Figure 21A:
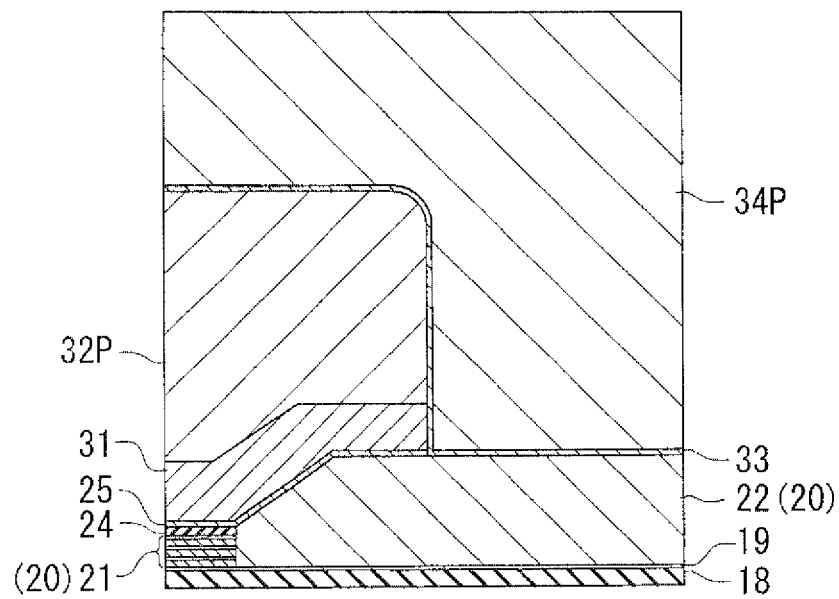
FIG. 21A and FIG. 21B are cross-sectional views showing a step that follows the step shown in FIG. 20A and FIG. 20B.
Figure 21B:
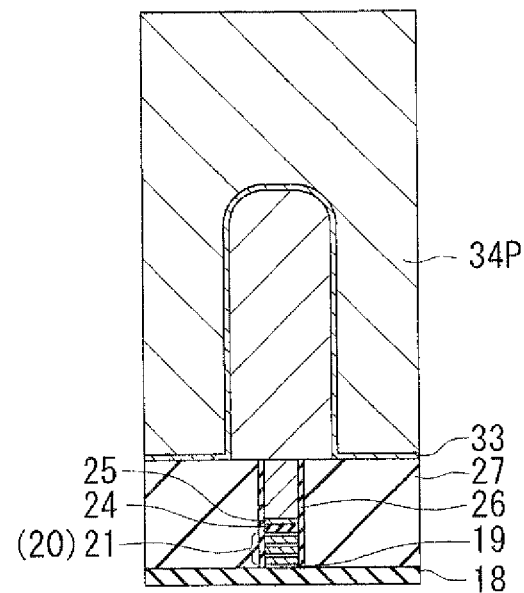

FIG. 21A and FIG. 21B show the next step. In this step, a nonmagnetic metal layer 34P for use to form the heat sink 34 is formed on the nonmagnetic metal film 33 so as to cover the metal section 22 of the plasmon generator 20, the surrounding layer 27 and the second magnetic layer 32P.

Figure 22A:
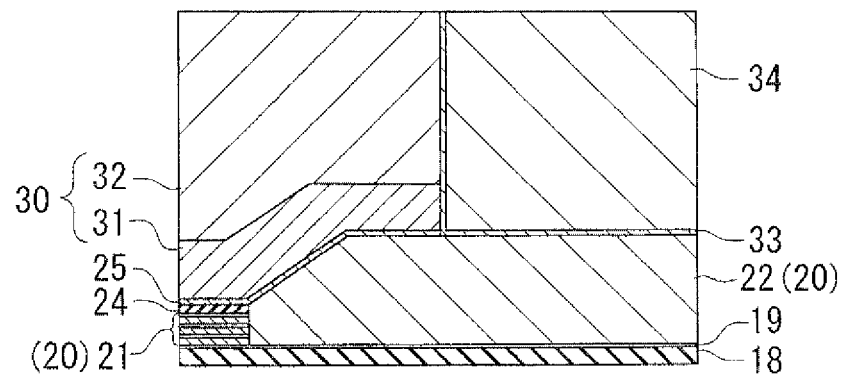
FIG. 22A and FIG. 22B are cross-sectional views showing a step that follows the step shown in FIG. 21A and FIG. 21B.
Figure 22B:
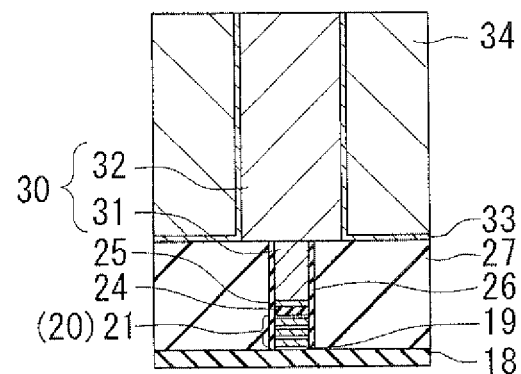

FIG. 22A and FIG. 22B show the next step. In this step, first, the dielectric layer 35 (see FIG. 5 and FIG. 6) is formed over the entire top surface of the stack. Then, the third layers of the coupling sections 13A and 13B, the second magnetic layer 32P, the nonmagnetic metal film 33, the nonmagnetic metal layer 34P and the dielectric layer 35 are polished by, for example, CMP, until the level of the top surface of the second layer 32 is reached. This polishing makes the second magnetic layer 32P into the second layer 32, and thereby completes the main pole 30. Further, this polishing makes the nonmagnetic metal layer 34P into the heat sink 34.

FIG. 23A and FIG. 23B show the next step. In this step, first, the nonmagnetic metal film 36 is formed on the heat sink 34. Then, the first layer 41 of the first yoke portion 40 is formed on the second layer 32, the dielectric layer 35 and the nonmagnetic metal film 36, and the coupling layer 37 (see FIG. 5) is formed on the third layers of the coupling sections 13A and 13B and the dielectric layer 35. Next, the dielectric layer 45 (see FIG. 5 and FIG. 6) is formed over the entire top surface of the stack. The dielectric layer 45 is then polished by, for example, CMP, until the first layer 41 and the coupling layer 37 are exposed.

Now, steps to follow the step shown in FIG. 23A and FIG. 23B will be described with reference to FIG. 5 and FIG. 6. First, the second layer 42 of the first yoke portion 40 is formed on the first layer 41, and the coupling layer 38 is formed on the coupling layer 37. Then, the insulating film 53 is formed over the entire top surface of the stack. The first layer 51 of the coil 50 is then formed on the insulating film 53. Next, the insulating layer 54 is formed over the entire top surface of the stack. The insulating film 53 and the insulating layer 54 are then polished by, for example, CMP, until the second layer 42, the coupling layer 38 and the first layer 51 are exposed.

Next, the insulating layer 55 is formed on the first layer 51 of the coil 50 and the insulating layer 54. Then, the third layer 43 of the first yoke portion 40 is formed on the second layer 42, and the coupling layer 39 is formed on the coupling layer 38. Next, the insulating film 56 is formed over the entire top surface of the stack. The insulating layer 55 and the insulating film 56 are then selectively etched to form therein openings for exposing the coil connection 51E (see FIG. 7) of the first layer 51 of the coil 50. Then, the second layer 52 of the coil 50 is formed on the insulating film 56 and the coil connection 51E. Next, the insulating layer 57 is formed over the entire top surface of the stack. The insulating film 56 and the insulating layer 57 are then polished by, for example, CMP, until the third layer 43, the coupling layer 39 and the second layer 52 are exposed.

Next, the insulating layer 58 is formed on the second layer 52 of the coil 50 and the insulating layer 57. The fourth layer 44 of the first yoke portion 40 is then formed on the third layer 43 of the first yoke portion 40, the coupling layer 39 and the insulating layer 58. Next, the insulating layer 59 is formed over the entire top surface of the stack. The insulating layer 59 is then polished by, for example, CMP, until the fourth layer 44 is exposed. Then, the protective layer 60 is formed to cover the fourth layer 44 and the insulating layer 59. Wiring, terminals, and other components are then formed on the top surface of the protective layer 60. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

In the aforementioned polishing step, the layers exposed in the medium facing surface 80 may be polished in different amounts due to differences between materials used for those layers, and this may cause irregularities on the medium facing surface 80.

Further, in the aforementioned polishing step, polishing residues of the metal materials may grow to cause smears. In order to remove the smears, the step of forming the medium facing surface 80 may include the step of etching the polished surface slightly by, for example, IBE, after the polishing step.

The method of manufacturing the thermally-assisted magnetic recording head according to the present embodiment forms the plasmon generator 20 by etching the initial plasmon generator constituted by the initial multilayer film section 21P and the initial metal section 22P, using the first magnetic layer 31P for use to form the first layer 31 of the main pole 30 as an etching mask. According to the present embodiment, this makes it possible to form the plasmon generator 20 and the main pole 30 in a self-aligned manner so that the first and second edges E1 and E2 of the first end face portion 31a of the front end face 30a of the main pole 30 and the third and fourth edges E3 and E4 of the near-field light generating surface 20a of the plasmon generator 20 are brought into the previously described positional relationship with each other.

Second Embodiment

Figure 24:
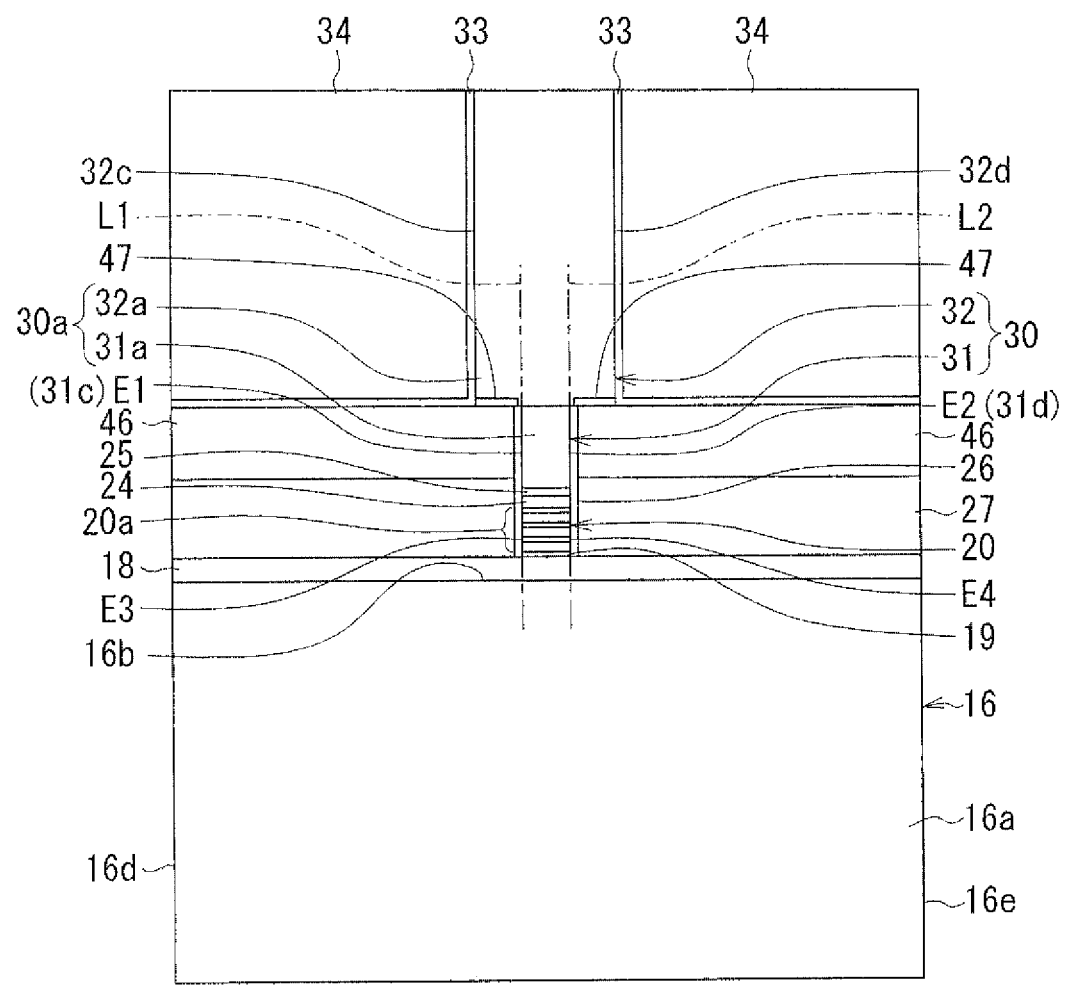
FIG. 24 is a front view showing the main part of a thermally-assisted magnetic recording head according to a second embodiment of the invention.
Figure 25:
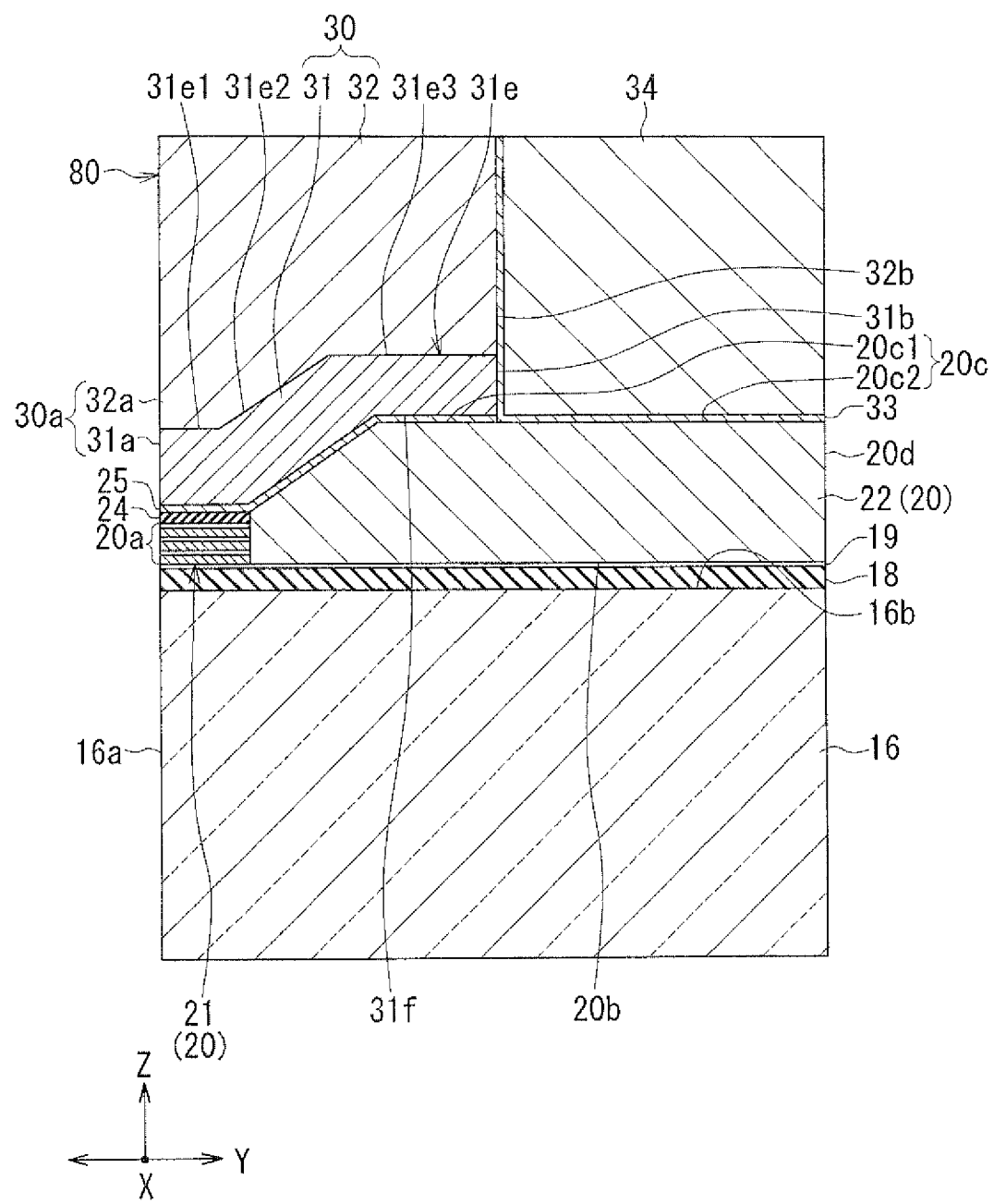
FIG. 25 is a cross-sectional view showing the main part of the thermally-assisted magnetic recording head according to the second embodiment of the invention.

A thermally-assisted magnetic recording head according to a second embodiment of the invention will now be described with reference to FIG. 24 and FIG. 25. FIG. 24 is a front view showing the main part of the thermally-assisted magnetic recording head according to the present embodiment. FIG. 25 is a cross-sectional view showing the main part of the thermally-assisted magnetic recording head according to the present embodiment.

The thermally-assisted magnetic recording head according to the present embodiment is configured differently than the first embodiment as described below. The thermally-assisted magnetic recording head according to the present embodiment includes a heat sink 46 provided around the plasmon generator 20 and the first layer 31 of the main pole 30. The heat sink 46 has the function of dissipating heat generated at the plasmon generator 20 and heat transferred from the plasmon generator 20 to the first layer 31 outward from the plasmon generator 20 and the first layer 31. For example, the heat sink 46 is formed of the same material as the heat sink 34 described in the first embodiment section. The heat sinks 34 and 46 each correspond to the heat sink of the present invention.

In the present embodiment, the top surface of the surrounding layer 27 is at a level different from that in the first embodiment. As shown in FIG. 24, in the present embodiment the top surface of the surrounding layer 27 is closer to the top surface 1a (see FIG. 5 and FIG. 6) of the substrate 1 than in the first embodiment. The heat sink 46 lies on the surrounding layer 27.

The heat sink 46 has an outer surface including a sixth portion and a seventh portion as described below. The sixth portion is opposed to at least part of the first side surface 31c of the first layer 31. The seventh portion is opposed to at least part of the second side surface 31d of the first layer 31. FIG. 24 shows an example in which the sixth portion is opposed to the entire first side surface 31c while the seventh portion is opposed to the entire second side surface 31d. In the present embodiment, the sixth portion is also opposed to part of the side surface 20e (see FIG. 2) of the plasmon generator 20 while the seventh portion is also opposed to part of the side surface 20f (see FIG. 2) of the plasmon generator 20. The dielectric film 26 is interposed between the sixth and the seventh portion of the outer surface of the heat sink 34 and each of the plasmon generator 20 and the first layer 31.

A portion of the heat sink 34 lies above the heat sink 46. Another portion of the heat sink 34 lies above the plasmon generator 20 and the surrounding layer 27. The nonmagnetic metal film 33 is interposed between the heat sink 34 and each of the heat sink 46, the plasmon generator 20 and the surrounding layer 27.

The thermally-assisted magnetic recording head according to the present embodiment further includes a nonmagnetic metal film 47 interposed between the second layer 32 of the main pole 30 and the heat sink 46. The nonmagnetic metal film 47 has the function of preventing the material of the heat sink 46 from diffusing into the second layer 32, and thereby preventing deterioration of the magnetic properties of the main pole 30. For example, the nonmagnetic metal film 47 is formed of the same material as the nonmagnetic metal film 25 described in the first embodiment section.

Figure 33A:
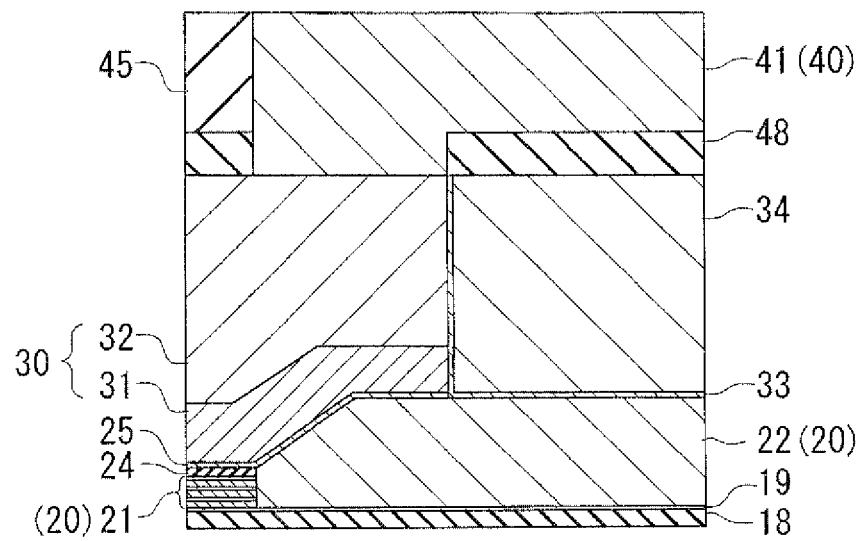
FIG. 33A and FIG. 33B are cross-sectional views showing a step that follows the step shown in FIG. 32A and FIG. 32B.
Figure 33B:
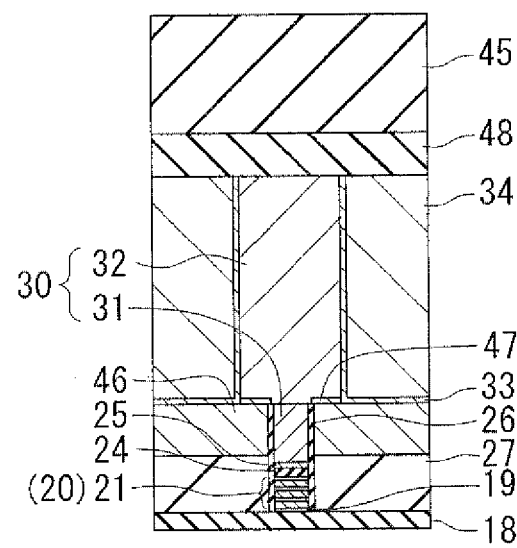

The thermally-assisted magnetic recording head further includes a dielectric layer 48 in place of the nonmagnetic metal film 36 described in the first embodiment section. The dielectric layer 48 is shown in FIG. 33A and FIG. 33B to be described later. The dielectric layer 48 is interposed between the heat sink 34 and the first layer 41 of the first yoke portion 40. The dielectric layer 48 is formed of alumina, for example. In the present embodiment, the first layer 41 has an end face facing toward the medium facing surface 80 and located at a distance from the medium facing surface 80.

In the present embodiment, the heat sink 46 is located closer to the plasmon generator 20 and the first layer 31 than is the heat sink 34. This allows for more effective dissipation of the heat generated at the plasmon generator 20 and the heat transferred from the plasmon generator 20 to the first layer 31 outward from the plasmon generator 20 and the first layer 31.

A method of manufacturing the thermally-assisted magnetic recording head according to the present embodiment will now be described with reference to FIG. 26A through FIG. 33B. FIG. 26A through FIG. 33B each show a stack of layers formed in the process of manufacturing the thermally-assisted magnetic recording head. FIG. 26A through FIG. 33B omit the illustration of portions located below the cladding layer 18. FIG. nA (n is an integer between 26 and 33 inclusive) shows a cross section that intersects the front end face 30a of the main pole 30 and that is perpendicular to the medium facing surface 80 and to the top surface 1a (see FIG. 5 and FIG. 6) of the substrate 1. FIG. nB shows a cross section of the stack taken at the location at which the medium facing surface 80 is to be formed.

Figure 26A:
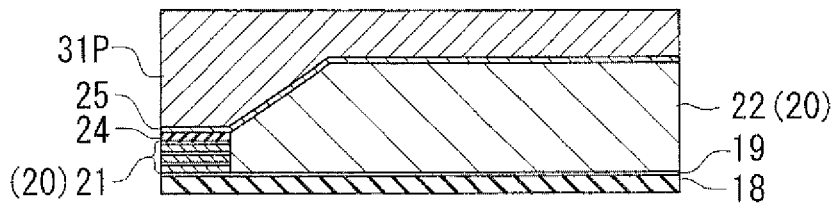
FIG. 26A and FIG. 26B are cross-sectional views showing a step of a method of manufacturing the thermally-assisted magnetic recording head according to the second embodiment of the invention.
Figure 26B:
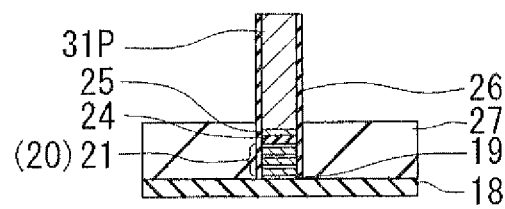

The method of manufacturing the thermally-assisted magnetic recording head according to the present embodiment is the same as the method according to the first embodiment up to the step shown in FIG. 17A and FIG. 17B. FIG. 26A and FIG. 26B show the next step. In this step, a portion of the surrounding layer 27 is etched by wet etching, for example. This etching continues until the top surface of the etched surrounding layer 27 reaches the level that is closer to the top surface 1a (see FIG. 5 and FIG. 6) of the substrate 1 than is the first flat portion 31e1 (see FIG. 25) of the top surface 31e of the first layer 31 of the main pole 30 to be formed later. In the example shown in FIG. 26A and FIG. 26B, the top surface of the etched surrounding layer 27 is farther from the top surface 1a of the substrate 1 than is the top surface of the multilayer film section 21 of the plasmon generator 20.

Figure 27A:
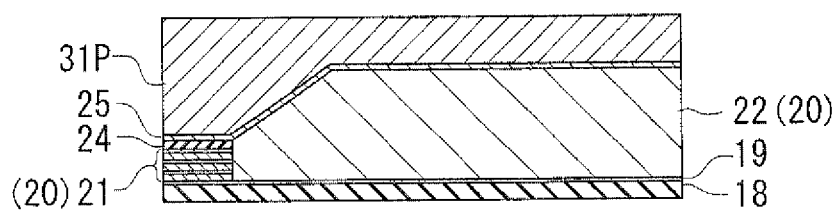
FIG. 27A and FIG. 27B are cross-sectional views showing a step that follows the step shown in FIG. 26A and FIG. 26B.
Figure 27B:
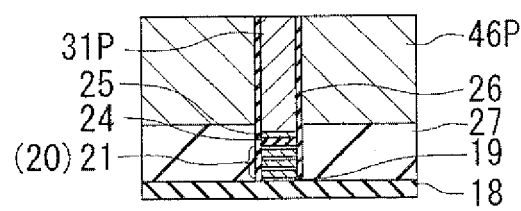

FIG. 27A and FIG. 27B show the next step. In this step, first, a nonmagnetic metal layer 46P for use to form the heat sink 46 is formed to cover the metal section 22 of the plasmon generator 20, the surrounding layer 27 and the first magnetic layer 31P. As has been described in the first embodiment section, the first magnetic layer 31P is a magnetic layer for use to form the first layer 31 of the main pole 30. Then, the nonmagnetic metal layer 46P is polished by, for example, CMP, until the first magnetic layer 31P is exposed.

Figure 28A:
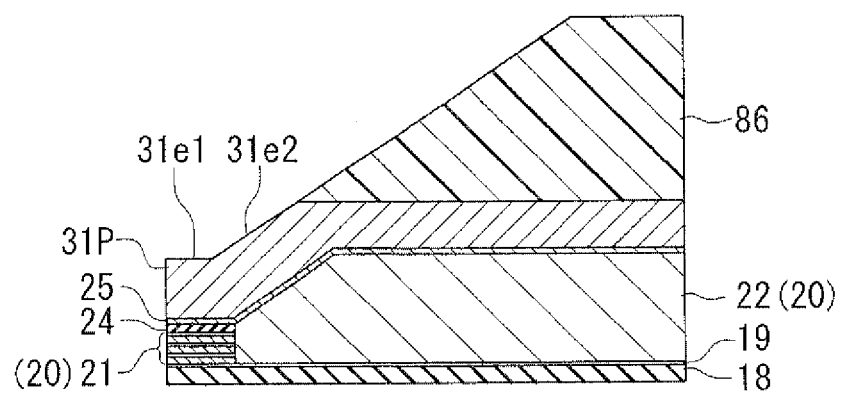
FIG. 28A and FIG. 28B are cross-sectional views showing a step that follows the step shown in FIG. 27A and FIG. 27B.
Figure 28B:
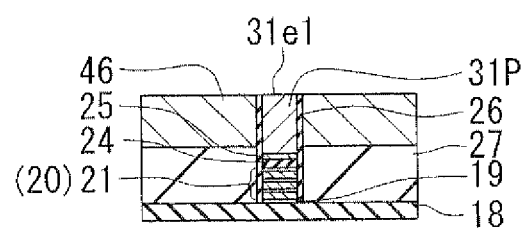

FIG. 28A and FIG. 28B show the next step. In this step, first, a photoresist mask 86 is formed on the first magnetic layer 31P and the nonmagnetic metal layer 46P at a location apart from the location at which the medium facing surface 80 is to be formed. The photoresist mask 86 is formed by patterning a photoresist layer by photolithography. Then, respective portions of the dielectric film 26, the first magnetic layer 31P and the nonmagnetic metal layer 46P are etched by, for example, RIE or IBE using the photoresist mask 86 so as to provide the first magnetic layer 31P with the first flat portion 31e1 and the inclined portion 31e2 of the top surface 31e of the first layer 31. This etching makes the nonmagnetic metal layer 46P into the heat sink 46. The photoresist mask 86 is then removed.

Figure 29A:
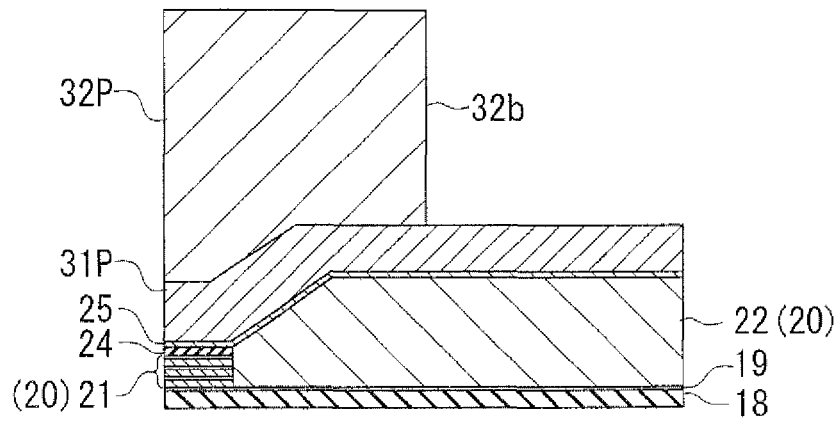
FIG. 29A and FIG. 29B are cross-sectional views showing a step that follows the step shown in FIG. 28A and FIG. 28B.
Figure 29B:
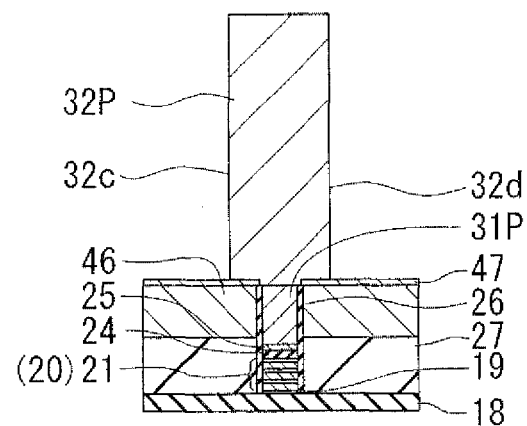

FIG. 29A and FIG. 29B show the next step. In this step, first, in the same manner as the step shown in FIG. 19A and FIG. 19B, the cladding layer 18 and the surrounding layer 27 are etched and then the third layers of the coupling sections 13A and 13B shown in FIG. 5 are formed. Next, the nonmagnetic metal film 47 with an opening for exposing the top surface of the first magnetic layer 31P is formed on the heat sink 46. Then, the second magnetic layer 32P for use to form the second layer 32 of the main pole 30 is formed on the first magnetic layer 31P and the nonmagnetic metal film 47. The second magnetic layer 32P has the same shape as in the first embodiment.

Figure 30A:
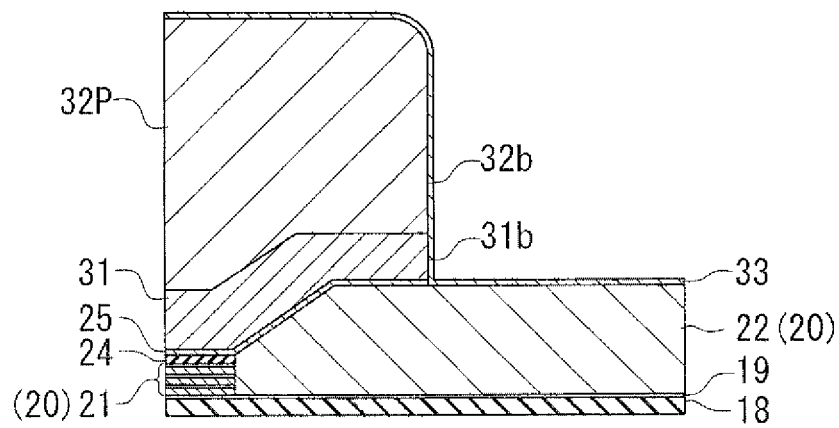
FIG. 30A and FIG. 30B are cross-sectional views showing a step that follows the step shown in FIG. 29A and FIG. 29B.
Figure 30B:
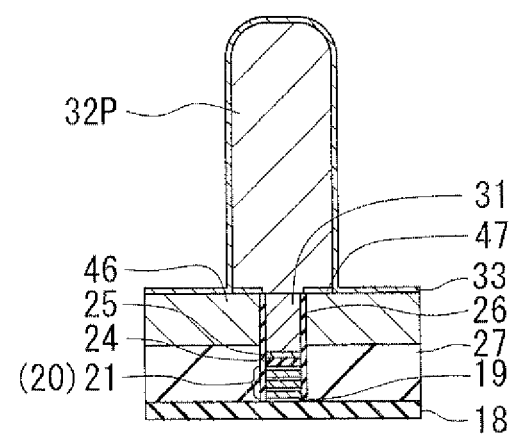

FIG. 30A and FIG. 30B show the next step. In this step, first, the first magnetic layer 31P and the nonmagnetic metal film 47 are etched by, for example, IBE, using the second magnetic layer 32P as an etching mask. This etching makes the first magnetic layer 31P into the first layer 31. Next, the nonmagnetic metal film 33 is formed to cover the metal section 22 of the plasmon generator 20, the surrounding layer 27, the first layer 31, the second magnetic layer 32P and the heat sink 46.

Figure 31A:
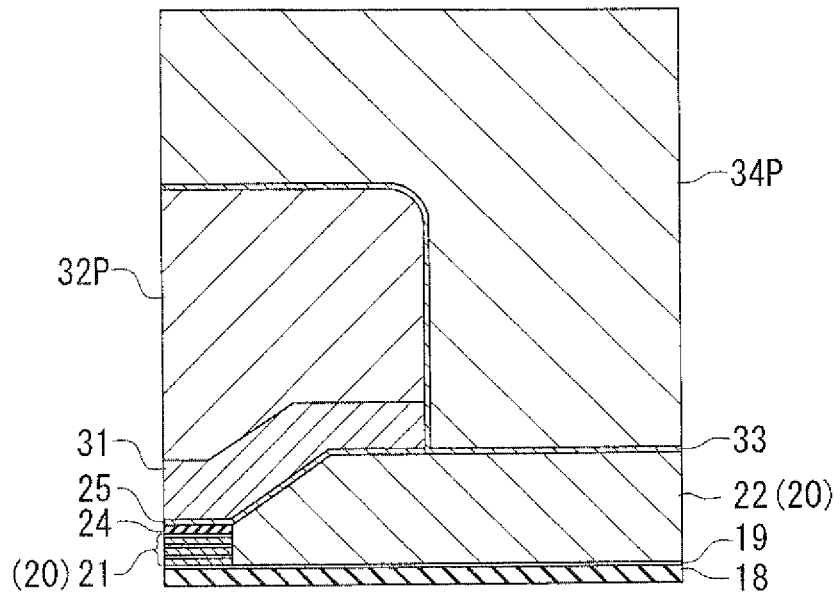
FIG. 31A and FIG. 31B are cross-sectional views showing a step that follows the step shown in FIG. 30A and FIG. 30B.
Figure 31B:
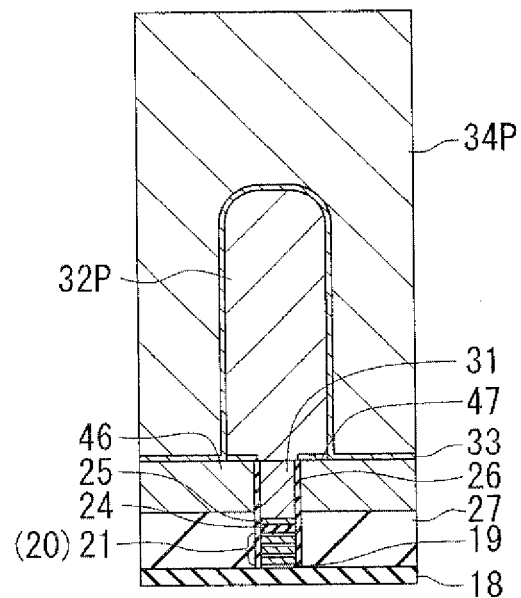

FIG. 31A and FIG. 31B show the next step. In this step, a nonmagnetic metal layer 34P for use to form the heat sink 34 is formed on the nonmagnetic metal film 33 to cover the metal section 22 of the plasmon generator 20, the surrounding layer 27, the second magnetic layer 32P and the heat sink 46.

Figure 32A:
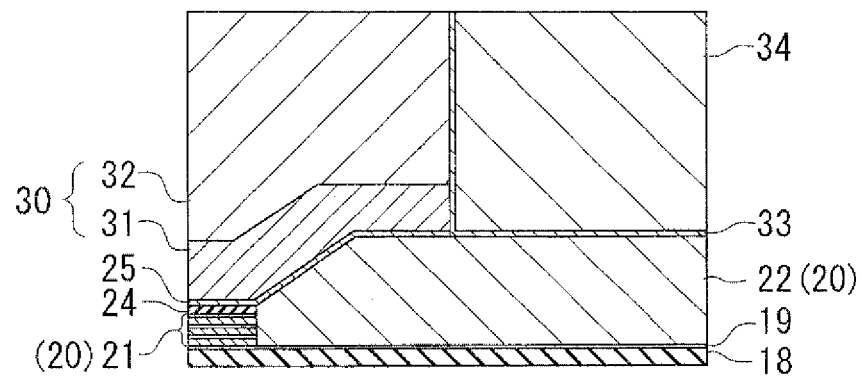
FIG. 32A and FIG. 32B are cross-sectional views showing a step that follows the step shown in FIG. 31A and FIG. 31B.
Figure 32B:
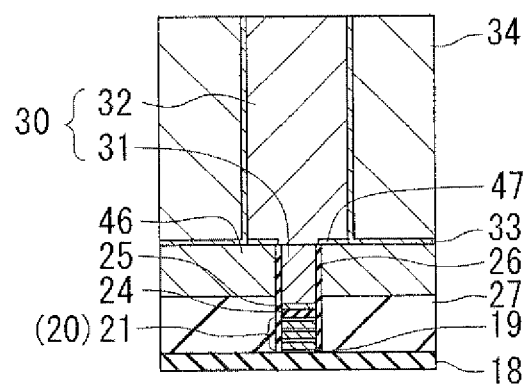

FIG. 32A and FIG. 32B show the next step. In this step, in the same manner as the step shown in FIG. 22A and FIG. 22A, the dielectric layer 35 is formed and then the third layers of the coupling sections 13A and 13B, the nonmagnetic metal film 33, the second magnetic layer 32P, the nonmagnetic metal layer 34P and the dielectric layer 35 are polished. This polishing makes the second magnetic layer 32P into the second layer 32, and thereby completes the main pole 30. Further, this polishing makes the nonmagnetic metal layer 34P into the heat sink 34.

FIG. 33A and FIG. 33B show the next step. In this step, first, the dielectric layer 48 is formed over the entire top surface of the stack. The dielectric layer 48 is then selectively etched to form therein an opening for exposing the top surface of the second layer 32 and openings for exposing the top surfaces of the third layers of the coupling sections 13A and 13B. Then, the first layer 41 of the first yoke portion 40 is formed on the second layer 32 and the dielectric layer 48, and the coupling layer 37 (see FIG. 5) is formed on the third layers of the coupling sections 13A and 13B and the dielectric layer 35. Next, the dielectric layer 45 is formed over the entire top surface of the stack. The dielectric layer 45 is then polished by, for example, CMP, until the first layer 41 and the coupling layer 37 are exposed. The subsequent steps are the same as in the first embodiment.

The remainder of configuration, function and effects of the present embodiment are similar to those of the first embodiment.

Third Embodiment

A thermally-assisted magnetic recording head according to a third embodiment of the invention will now be described. In the present embodiment, the main pole 30 is constituted not by the first layer 31 and the second layer 32 but by a single magnetic layer. The shape and location of the main pole 30 of the present embodiment are the same as those of the main pole 30 of the first embodiment.

In the present embodiment, as shown in FIG. 3, the first edge E1 of the first end face portion 31a of the main pole 30 and the third edge E3 of the near-field light generating surface 20a are located on the first imaginary straight line L1, while the second edge E2 of the first end face portion 31a and the fourth edge E4 of the near-field light generating surface 20a are located on the second imaginary straight line L2, as in the first embodiment.

A method of manufacturing the thermally-assisted magnetic recording head according to the present embodiment will now be described with reference to FIG. 34 to FIG. 37. FIG. 34 to FIG. 37 each illustrate a stack of layers formed in the process of manufacturing the thermally-assisted magnetic recording head. FIG. 34 to FIG. 37 omit the illustration of portions located below the cladding layer 18. FIG. 34 to FIG. 37 each show a cross section of the stack taken at the location at which the medium facing surface 80 is to be formed.

Figure 34:
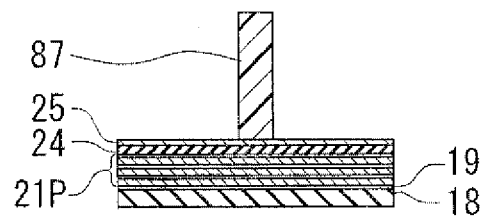
FIG. 34 is a cross-sectional view showing a step of a method of manufacturing a thermally-assisted magnetic recording head according to a third embodiment of the invention.

The method of manufacturing the thermally-assisted magnetic recording head according to the present embodiment is the same as the method according to the first embodiment up to the step shown in FIG. 12A and FIG. 12B. FIG. 34 shows the next step. In this step, first, the nonmagnetic metal film 25 is formed by, for example, sputtering, on the dielectric layer 24 and the initial metal section 22P (see FIG. 12B) which will later become the metal section 22 of the plasmon generator 20. Then, an etching mask 87 for patterning the initial plasmon generator constituted by the initial multilayer film section 21P and the initial metal section 22P is formed on the nonmagnetic metal film 25. The etching mask 87 is formed by patterning a photoresist layer by photolithography. The etching mask 87 has a planar shape corresponding to that of the plasmon generator 20.

Figure 35:
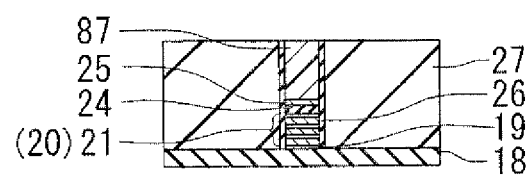
FIG. 35 is a cross-sectional view showing a step that follows the step shown in FIG. 34.

FIG. 35 shows the next step. In this step, first, the nonmagnetic metal film 25, the dielectric layer 24, the initial plasmon generator and the adhesion layer 19 are etched by, for example, RIE or IBE, using the etching mask 87 so that the etching makes the initial plasmon generator into the plasmon generator 20.

Next, the dielectric film 26 is formed to cover the adhesion layer 19, the plasmon generator 20 (the multilayer film section 21 and the metal section 22), the dielectric layer 24, the nonmagnetic metal film 25 and the etching mask 87. The surrounding layer 27 is then formed around the plasmon generator 20 and the etching mask 87. More specifically, first, in the presence of the etching mask 87, a dielectric layer that will later become the surrounding layer 27 is formed over the entire top surface of the stack. Then, the dielectric film 26, the dielectric layer and the etching mask 87 are polished by, for example, CMP, until a portion of the nonmagnetic metal film 25 that lies on the flat portion of the top surface of the metal section 22 (see FIG. 4) of the plasmon generator 20 is exposed. A portion of the dielectric layer, the portion remaining around the plasmon generator 20 and the etching mask 87, constitutes the surrounding layer 27.

FIG. 35 shows the next step. In this step, the etching mask 87 is removed so that a recess 88 is formed by the plasmon generator 20 and the surrounding layer 27.

Figure 36:
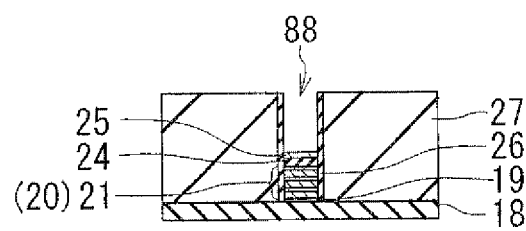
FIG. 36 is a cross-sectional view showing a step that follows the step shown in FIG. 35.
Figure 37:
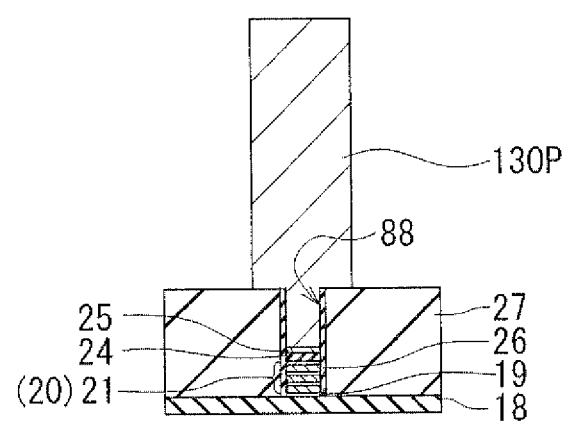
FIG. 37 is a cross-sectional view showing a step that follows the step shown in FIG. 36.

FIG. 36 shows the next step. In this step, first, the cladding layer 18 and the surrounding layer 27 are selectively etched to form therein two openings for exposing the top surfaces of the second layers of the coupling sections 13A and 13B shown in FIG. 5. Then, the third layers of the coupling sections 13A and 13B are formed on the second layers of the coupling sections 13A and 13B, respectively. Further, a magnetic layer 130P for use to form the main pole 30 of the present embodiment is formed on the surrounding layer 27 and the nonmagnetic metal film 25 such that a portion of the magnetic layer 130P is received in the recess 88. The third layers of the coupling sections 13A and 13B and the magnetic layer 130P are formed such that their top surfaces are located at a level higher than the top surface of the main pole 30 of the present embodiment to be formed later.

Next, in the same manner as the step shown in FIG. 20A and FIG. 20B, the nonmagnetic metal film 33 is formed to cover the nonmagnetic metal film 25, the surrounding layer 27 and the magnetic layer 130P. Then, in the same manner as the step shown in FIG. 21A and FIG. 21B, the nonmagnetic metal layer 34P for use to form the heat sink 34 is formed on the nonmagnetic metal film 33 so as to cover the metal section 22 of the plasmon generator 20, the surrounding layer 27 and the magnetic layer 130P. Next, in the same manner as the step shown in FIG. 22A and FIG. 22B, the dielectric layer 35 is formed over the entire top surface of the stack and then the third layers of the coupling sections 13A and 13B, the nonmagnetic metal film 33, the magnetic layer 130P, the nonmagnetic metal layer 34P and the dielectric layer 35 are polished by, for example, CMP, until the level of the top surface of the main pole 30 is reached. This polishing makes the magnetic layer 130P into the main pole 30 of the present embodiment, and makes the nonmagnetic metal layer 34P into the heat sink 34. The subsequent steps are the same as in the first embodiment.

According to the present embodiment, the recess 88 is formed by removing the etching mask 87 which has been used for patterning the plasmon generator 20, and the magnetic layer 130P for use to form the main pole 30 is formed such that a portion thereof is received in the recess 88. This makes it possible to form the plasmon generator 20 and the main pole 30 in a self-aligned manner so that the first and second edges E1 and E2 of the first end face portion 31a of the front end face 30a of the main pole 30 of the present embodiment and the third and fourth edges E3 and E4 of the near-field light generating surface 20a of the plasmon generator 20 are brought into the previously described positional relationship with each other.

The remainder of configuration, function and effects of the present embodiment are similar to those of the first embodiment.

Fourth Embodiment

Figure 38:
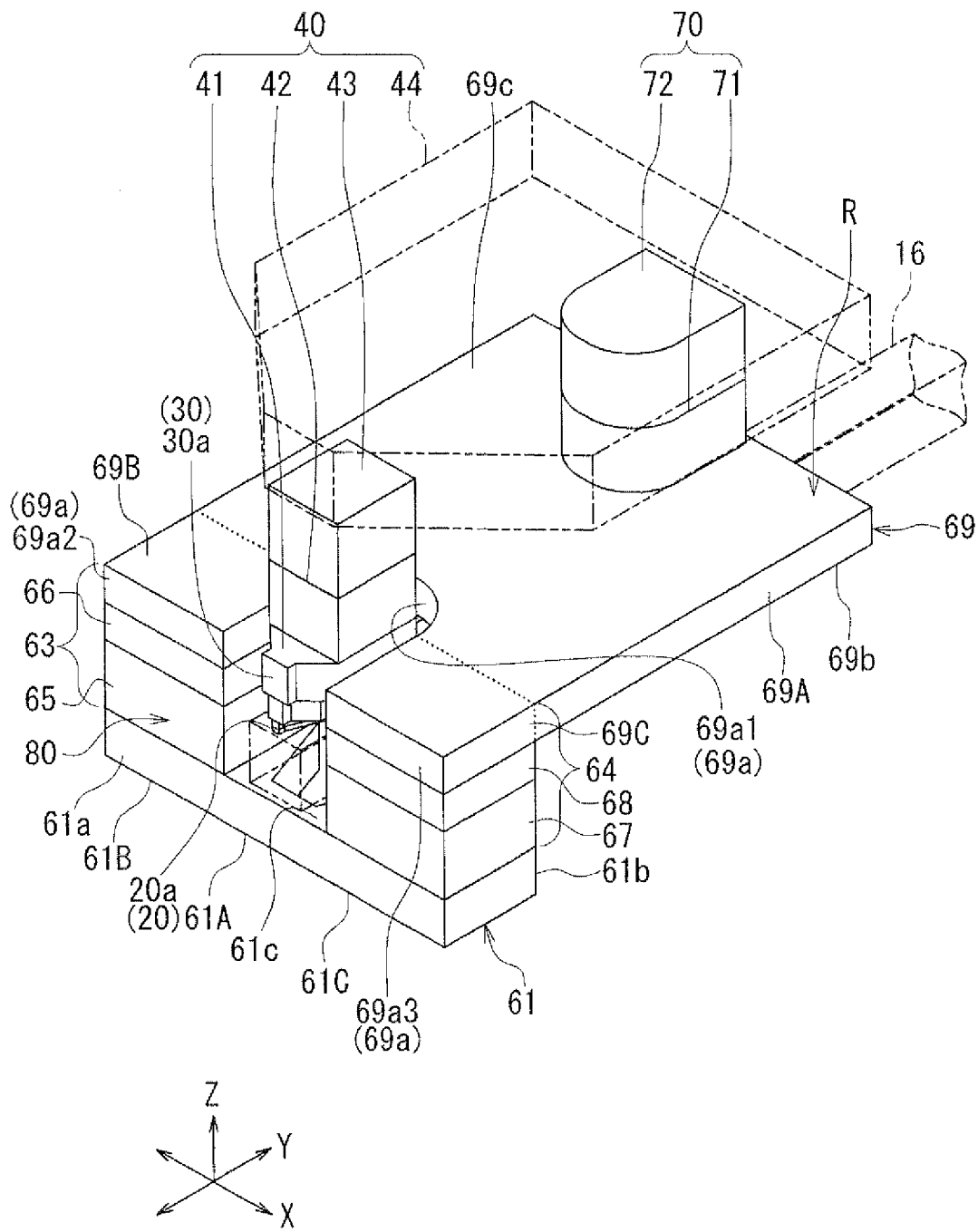
FIG. 38 is a perspective view showing the main part of a thermally-assisted magnetic recording head according to a fourth embodiment of the invention.
Figure 39:
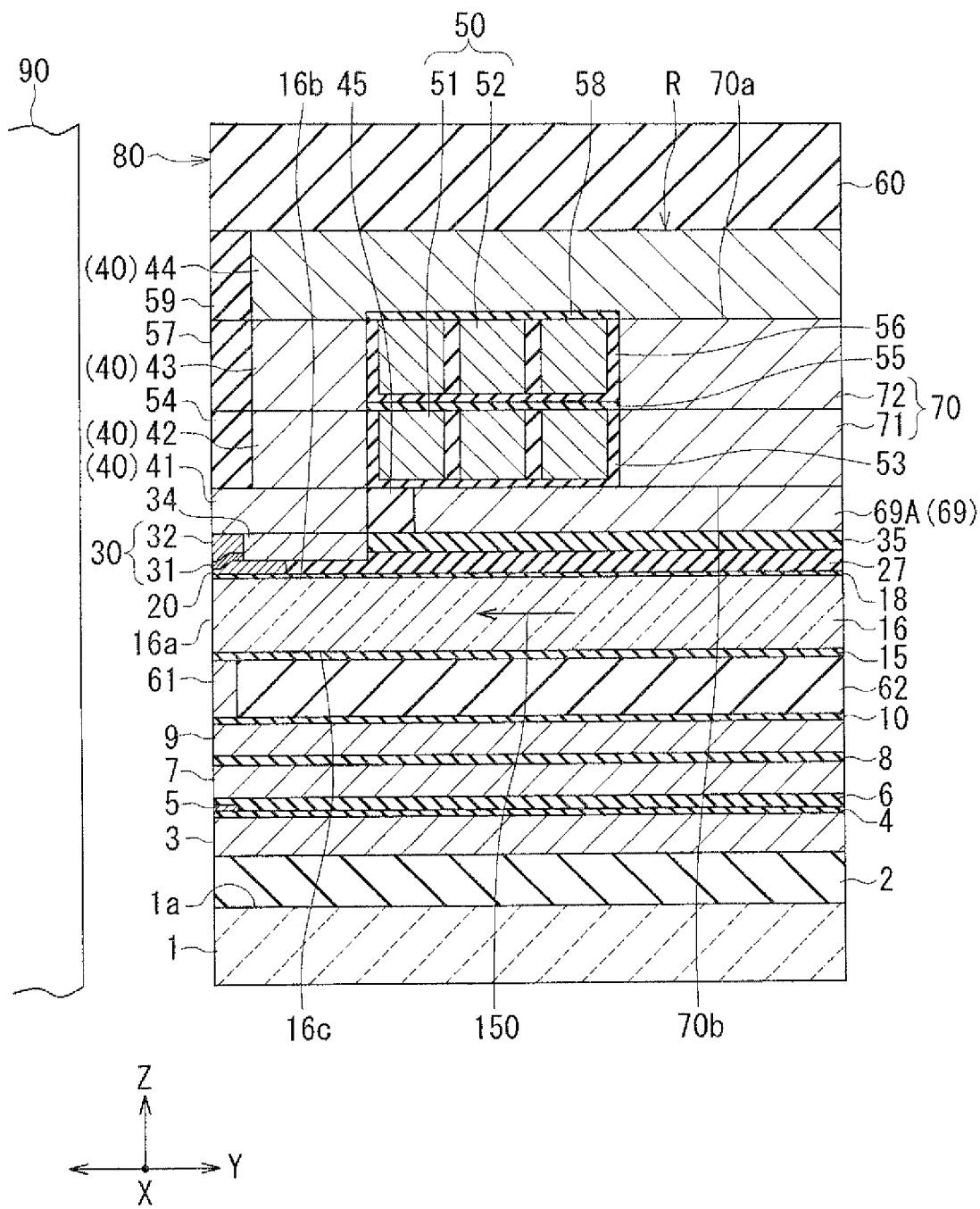
FIG. 39 is a cross-sectional view showing the configuration of the thermally-assisted magnetic recording head according to the fourth embodiment of the invention.
Figure 40:
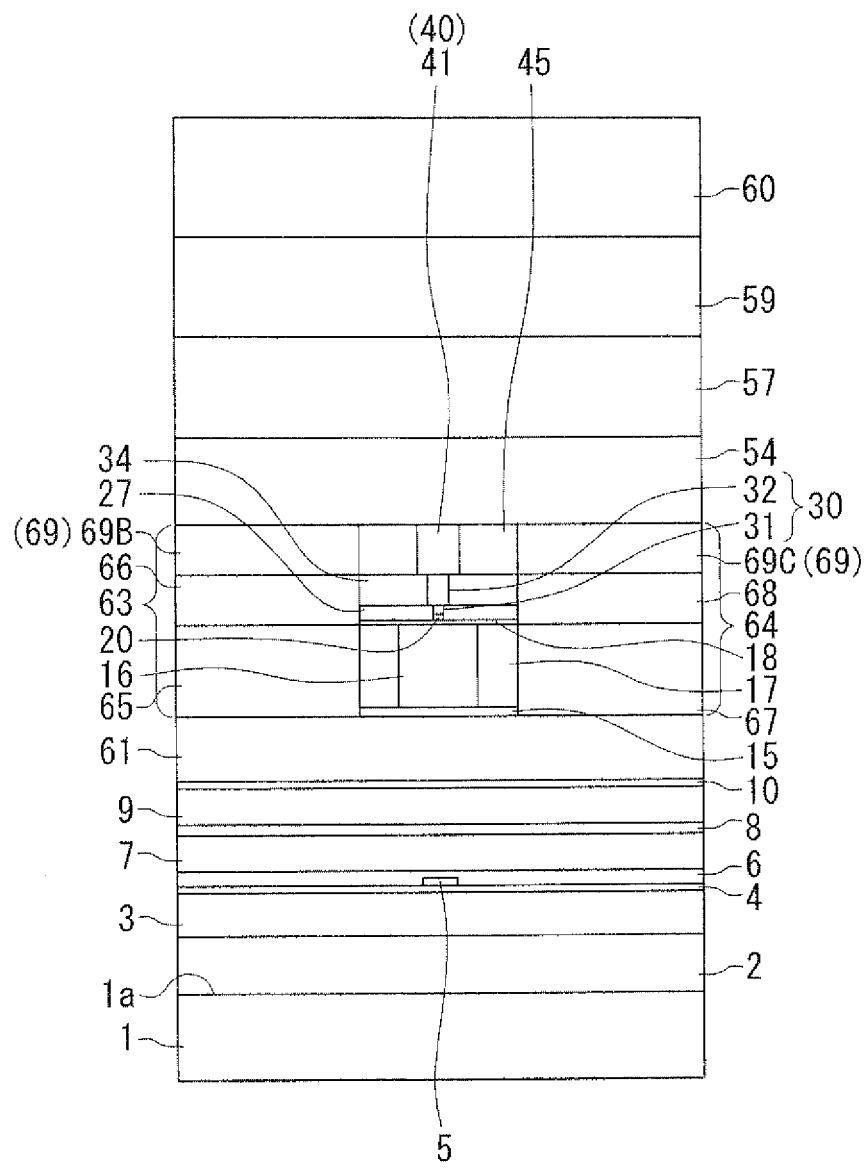
FIG. 40 is a front view showing the medium facing surface of the thermally-assisted magnetic recording head according to the fourth embodiment of the invention.
Figure 41:
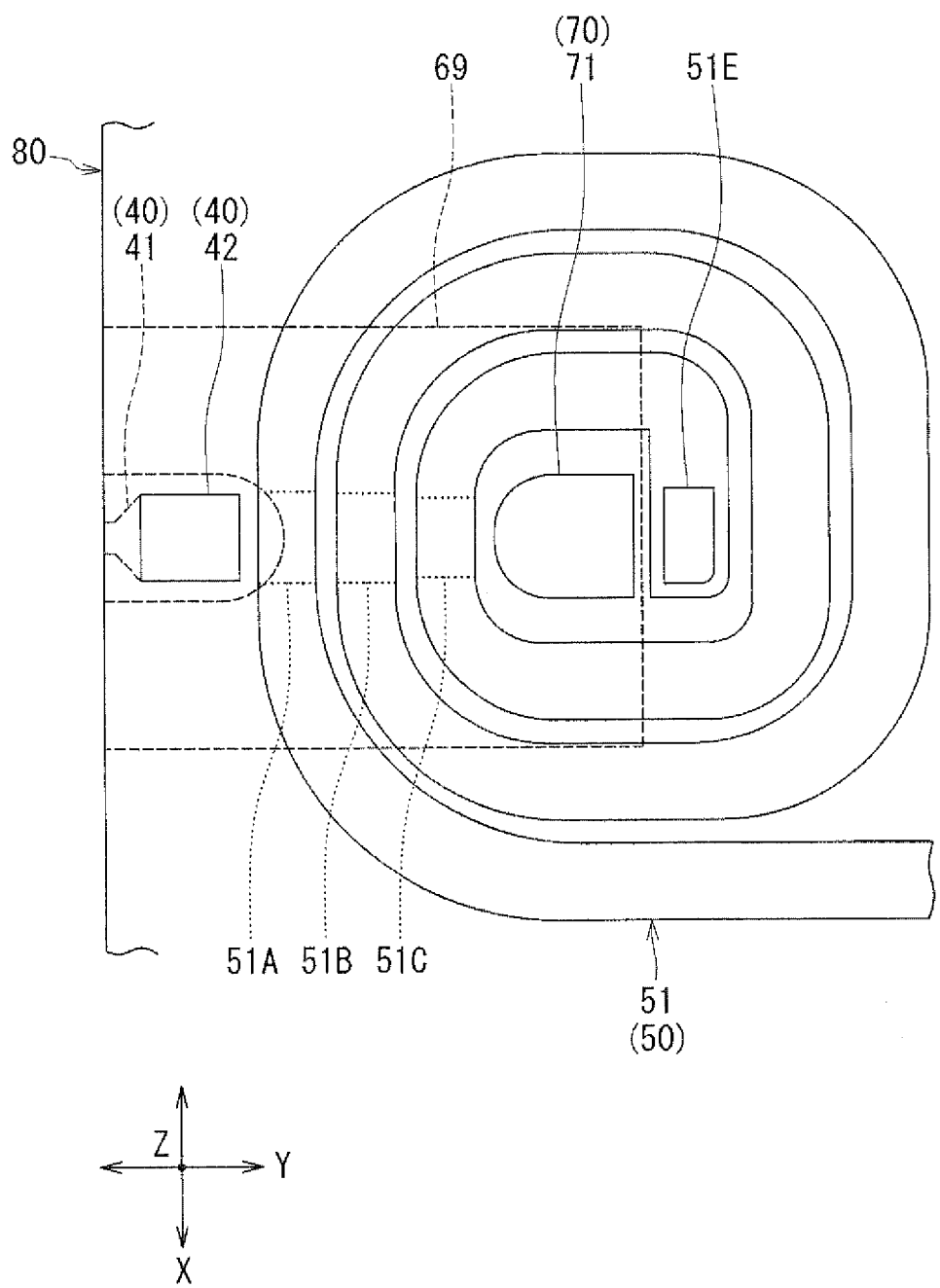
FIG. 41 is a plan view showing the first layer of the coil of the fourth embodiment of the invention.
Figure 42:
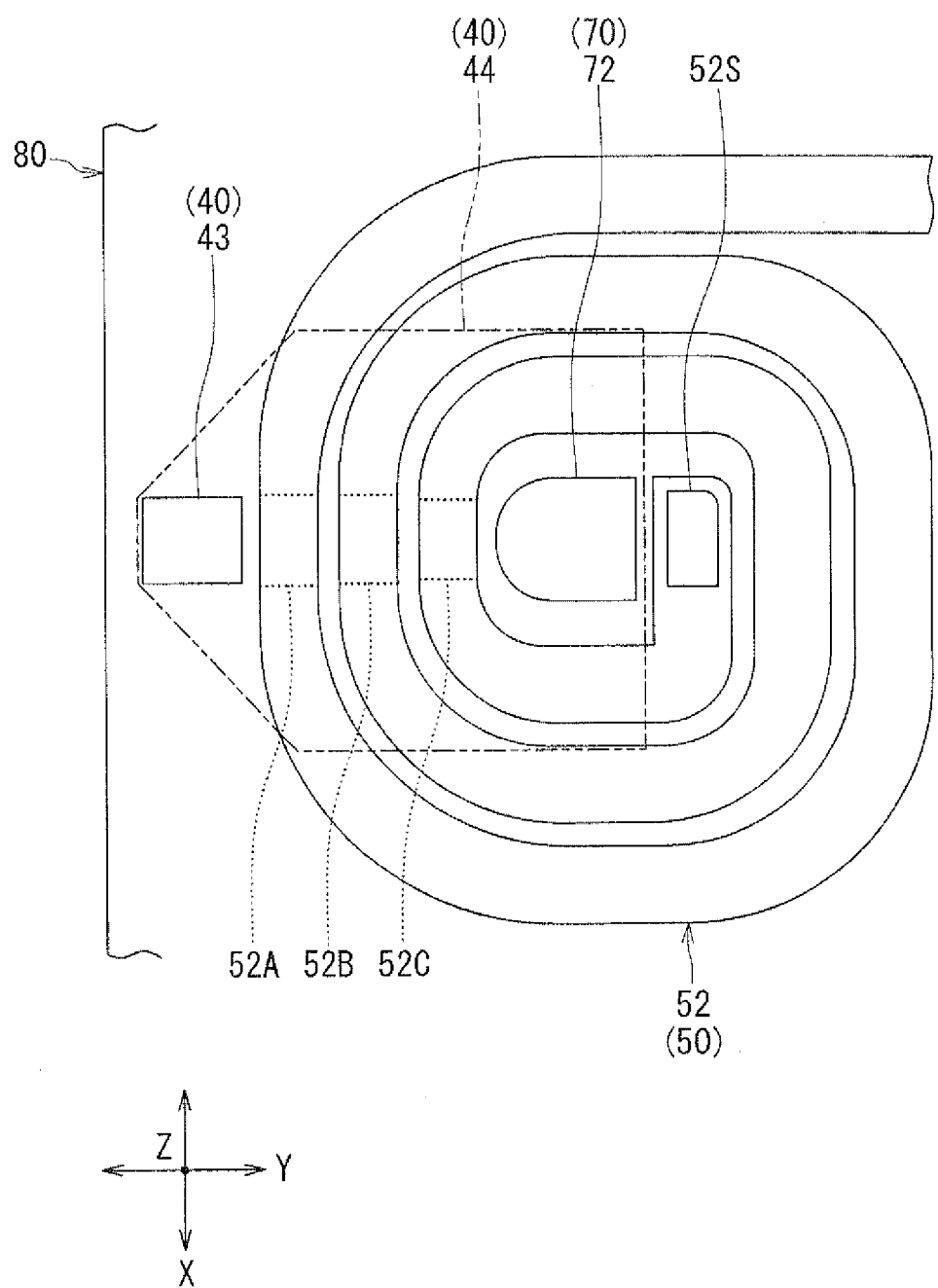
FIG. 42 is a plan view showing the second layer of the coil of the fourth embodiment of the invention.

A thermally-assisted magnetic recording head according to a fourth embodiment of the invention will now be described with reference to FIG. 38 to FIG. 42. FIG. 38 is a perspective view showing the main part of the thermally-assisted magnetic recording head. FIG. 39 is a cross-sectional view showing the configuration of the thermally-assisted magnetic recording head. FIG. 40 is a front view showing the medium facing surface of the thermally-assisted magnetic recording head. FIG. 41 is a plan view showing a first layer of the coil of the present embodiment. FIG. 42 is a plan view showing a second layer of the coil of the present embodiment.

The configuration of the thermally-assisted magnetic recording head according to the present embodiment differs from the first embodiment in the following ways. The thermally-assisted magnetic recording head according to the present embodiment includes a shield 61 formed of a magnetic material, in place of the shield 12. Further, the components of the return path section R of the first embodiment other than the first yoke portion 40, that is, the return pole layer 11, the coupling sections 13A and 13B, and the coupling layers 37 to 39, are eliminated from the present embodiment. Instead, the return path section R of the present embodiment includes a second yoke portion 69A, a first columnar portion 70, a second columnar portion 63, and a third columnar portion 64. Further, the present embodiment is not provided with the non-illustrated insulating layer and the insulating layer 14 around the return pole layer 11.

The shield 61 lies on the nonmagnetic layer 10. As shown in FIG. 38, the shield 61 has an end face 61a located in the medium facing surface 80, a rear end face 61b opposite to the end face 61a, and a top surface 61c. The front end face 30a of the main pole 30 and the end face 61a of the shield 61 are at locations different from each other in the direction of travel of the recording medium 90. In the present embodiment, the end face 61a of the shield 61 is located on the rear side in the direction of travel of the recording medium 90 relative to the front end face 30a of the main pole 30.

The shield 61 includes a central portion 61A, a first side portion 61B and a second side portion 61C, the first and second side portions 61B and 61C being located on opposite sides of the central portion 61A in the track width direction (the X direction). The length of the central portion 61A in the direction perpendicular to the medium facing surface 80 is constant regardless of position along the track width direction. The maximum length of each of the side portions 61B and 61C in the direction perpendicular to the medium facing surface 80 is greater than the length of the central portion 61A in that direction.

The thermally-assisted magnetic recording head according to the present embodiment includes an insulating layer 62 lying on the nonmagnetic layer 10 and surrounding the shield 61. The insulating layer 62 is formed of alumina, for example.

The thermally-assisted magnetic recording head according to the present embodiment further includes a magnetic layer 69 formed of a magnetic material. The magnetic layer 69 is embedded in the dielectric layer 45. The magnetic layer 69 is located at a predetermined distance from the first layer 41 of the first yoke portion 40.

As shown in FIG. 38, the magnetic layer 69 has a front end face 69a facing toward the medium facing surface 80, a bottom surface 69b, and a top surface 69c. The front end face 69a of the magnetic layer 69 includes a first portion 69a1, a second portion 69a2 and a third portion 69a3, the second and third portions 69a2 and 69a3 being located on opposite sides of the first portion 69a1 in the track width direction. The first portion 69a1 is shaped to be recessed such that the track-widthwise center of the first portion 69a1 is farthest from the medium facing surface 80. The first portion 69a1 is disposed to surround the first layer 41 of the first yoke portion 40. The second and third portions 69a2 and 69a3 are located in the medium facing surface 80.

The magnetic layer 69 includes the second yoke portion 69A as its main portion. The magnetic layer 69 further includes two coupling sections 69B and 69C coupled to the second yoke portion 69A, the two coupling sections 69B and 69C being located on opposite sides of the first layer 41 of the first yoke portion 40 in the track width direction in the vicinity of the medium facing surface 80. In FIG. 38 the boundaries between the second yoke portion 69A and the coupling sections 69B and 69C are indicated in dotted lines. The coupling section 69B includes the second portion 69a2 of the front end face 69a. The coupling section 69C includes the third portion 69a3 of the front end face 69a.

The thermally-assisted magnetic recording head according to the present embodiment further includes four magnetic layers 65, 66, 67 and 68 each formed of a magnetic material. The magnetic layers 65 and 67 are embedded in the cladding layers 15 and 17. The magnetic layers 65 and 67 are located on opposite sides of the core 16 in the track width direction in the vicinity of the medium facing surface 80. The magnetic layers 66 and 68 are located on the magnetic layers 65 and 67, respectively, and are embedded in the cladding layer 18, the surrounding layer 27 and the dielectric layer 35. The magnetic layers 66 and 68 are located on opposite sides of the plasmon generator 20 and the main pole 30 in the track width direction in the vicinity of the medium facing surface 80.

The magnetic layers 65 and 66 penetrate the cladding layers 15, 17 and 18, the surrounding layer 27 and the dielectric layer 35, and connect a portion of the shield 61 and a portion of the magnetic layer 69 to each other. Each of the magnetic layers 65 and 66 has a front end face located in the medium facing surface 80, a top surface, and a bottom surface. The bottom surface of the magnetic layer 65 is in contact with a portion of the top surface 61c of the shield 61 that is included in the first side portion 61B. The top surface of the magnetic layer 65 is in contact with the bottom surface of the magnetic layer 66. The top surface of the magnetic layer 66 is in contact with a portion of the bottom surface 69b of the magnetic layer 69 that is included in the coupling section 69B.

The magnetic layers 67 and 68 penetrate the cladding layers 15, 17 and 18, the surrounding layer 27 and the dielectric layer 35, and connect another portion of the shield 61 and another portion of the magnetic layer 69 to each other. Each of the magnetic layers 67 and 68 has a front end face located in the medium facing surface 80, a top surface, and a bottom surface. The bottom surface of the magnetic layer 67 is in contact with a portion of the top surface 61c of the shield 61 that is included in the second side portion 61C. The top surface of the magnetic layer 67 is in contact with the bottom surface of the magnetic layer 68. The top surface of the magnetic layer 68 is in contact with a portion of the bottom surface 69b of the magnetic layer 69 that is included in the coupling section 69C.

The second columnar portion 63 is constituted by the magnetic layers 65 and 66 and the coupling section 69B of the magnetic layer 69. The third columnar portion 64 is constituted by the magnetic layers 67 and 68 and the coupling section 69C of the magnetic layer 69. As shown in FIG. 38 and FIG. 40, the second columnar portion 63 and the third columnar portion 64 are located on opposite sides of the plasmon generator 20 and the main pole 30 in the track width direction and spaced from the plasmon generator 20 and the main pole 30.

As described above, since each of the magnetic layers 65 to 69 is formed of magnetic metal, each of the second and third columnar portions 63 and 64 is also formed of magnetic metal.

The first columnar portion 70 has a first end 70a and a second end 70b opposite to each other in the direction of travel of the recording medium 90. In the present embodiment, the first end 70a lies at the front-side end of the first columnar portion 70 in the direction of travel of the recording medium 90, i.e., the trailing-side end of the first columnar portion 70, whereas the second end 70b lies at the rear-side end of the first columnar portion 70 in the direction of travel of the recording medium 90, i.e., the leading-side end of the first columnar portion 70.

The first columnar portion 70 includes a first layer 71 and a second layer 72. The first layer 71 includes the second end 70b and lies on a portion of the top surface 69c of the magnetic layer 69 at a location farther from the medium facing surface 80 than the main pole 30. The second layer 72 includes the first end 70a and lies on the first layer 71.

In the present embodiment, the first layer 51 of the coil 50 is wound approximately three times around the first layer 71 of the first columnar portion 70. The second layer 52 of the coil 50 is wound approximately three times around the second layer 72 of the first columnar portion 70. The fourth layer 44 of the first yoke portion 40 lies on the third layer 43 of the first yoke portion 40, the second layer 72 of the first columnar portion 70 and the insulating layer 58.

As has been described, the return path section R of the present embodiment includes the first yoke portion 40, the second yoke portion 69A, the first columnar portion 70, the second columnar portion 63, and the third columnar portion 64. As shown in FIG. 38 and FIG. 39, the first yoke portion 40, the second yoke portion 69A and the first columnar portion 70 are located on the same side in the direction of travel of the recording medium 90 relative to the core 16. In the present embodiment, the first yoke portion 40, the second yoke portion 69A and the first columnar portion 70 are located on the trailing side, i.e., the front side in the direction of travel of the recording medium 90, relative to the core 16. The first columnar portion 70 has the first end 70a and the second end 70b, and is located away from the medium facing surface 80. As shown in FIG. 38, the second and third columnar portions 63 and 64 are located closer to the medium facing surface 80 than is the first columnar portion 70.

The first yoke portion 40 connects the main pole 30 to the first end 70a of the first columnar portion 70. The second columnar portion 63 and the third columnar portion 64 are located on opposite sides of the plasmon generator 20 in the track width direction and are connected to the shield 61. The second yoke portion 69A is connected to the second end 70b of the first columnar portion 70, and is connected to the shield 61 via the second and third columnar portions 63 and 64.

The shield 61 has the same functions as those of the shield 12 described in the first embodiment section. Specifically, the shield 61 has the functions of capturing a disturbance magnetic field applied to the thermally-assisted magnetic recording head from the outside thereof; capturing a magnetic flux that is produced from the front end face 30a of the main pole 30 and spreads in directions other than the direction perpendicular to the plane of the recording medium 90, and thereby preventing the magnetic flux from reaching the recording medium 90; and allowing a magnetic flux that has been produced from the front end face 30a of the main pole 30 and has magnetized a portion of the recording medium 90 to flow back to the main pole 30.

The shape and location of the coil 50 of the present embodiment will now be described in detail with reference to FIG. 41 and FIG. 42. As shown in FIG. 41, the first layer 51 of the coil 50 is wound approximately three times around the first layer 71 of the first columnar portion 70. The first layer 51 includes the coil connection 51E described in the first embodiment section, and further includes three conductor portions (hereinafter referred to as linear conductor portions) 51A, 51B and 51C interposed between the first layer 71 of the first columnar portion 70 and the medium facing surface 80 and extending linearly in parallel to the medium facing surface 80. The linear conductor portions 51A, 51B and 51C are arranged in this order along the direction perpendicular to the medium facing surface 80, the linear conductor portion 51A being closest to the medium facing surface 80. Each of the linear conductor portions 51A, 51B and 51C has a constant width in the direction perpendicular to the medium facing surface 80 (the Y direction). In FIG. 41, the locations of opposite ends of each of the linear conductor portions 51A, 51B and 51C in the track width direction (the X direction) are indicated in dotted lines. This also applies to other drawings that show other linear conductor portions.

As shown in FIG. 42, the second layer 52 of the coil 50 is wound approximately three times around the second layer 72 of the first columnar portion 70. The second layer 52 includes the coil connection 52S described in the first embodiment section, and further includes three linear conductor portions 52A, 52B and 52C interposed between the second layer 72 of the first columnar portion 70 and the medium facing surface 80. Each of the linear conductor portions 52A, 52B and 52C has a constant width in the direction perpendicular to the medium facing surface 80 (the Y direction).

The specific functions and effects of the thermally-assisted magnetic recording head according to the present embodiment will now be described. In the present embodiment, the near-field light generating surface 20a of the plasmon generator 20 is located between the front end face 30a of the main pole 30 and the end face 61a of the shield 61. A portion of the core 16 is located in the vicinity of the plasmon generator 20. The core 16 and the return path section R are configured to intersect each other without contacting each other. More specifically, the second and third columnar portions 63 and 64 of the return path section R are located on opposite sides of the core 16 in the track width direction without contacting the core 16.

In the present embodiment, the first yoke portion 40, the second yoke portion 69A and the first columnar portion 70 are located on the same side in the direction of travel of the recording medium 90 relative to the core 16, and the coil 50 is wound around the first columnar portion 70. The present embodiment allows the first columnar portion 70 to be small in width in the track width direction regardless of distance between the respective outer ends of the second and third columnar portions 63 and 64 in the track width direction. The present embodiment thus allows the coil 50 to be small in entire length.

In order to improve the write characteristics in high frequency bands, it is desirable that the magnetic path formed by the main pole 30 and the return path section R be reduced in length. To achieve this, it is effective to bring the first columnar portion 70 into close proximity to the medium facing surface 80. In the present embodiment, the coil 50 is wound around the first columnar portion 70 which is small in width in the track width direction. Accordingly, even if the first columnar portion 70 is brought into close proximity to the medium facing surface 80, it is possible to avoid an increase in length of each of the linear conductor portions 51A, 51B and 51C of the first layer 51 of the coil 50 located between the first layer 71 of the first columnar portion 70 and the medium facing surface 80 and an increase in length of each of the linear conductor portions 52A, 52B and 52C of the second layer 52 of the coil 50 located between the second layer 72 of the first columnar portion 70 and the medium facing surface 80. The present embodiment thus allows the first columnar portion 70 to be located close to the medium facing surface 80 without causing a significant increase in resistance of the coil 50. Consequently, the present embodiment makes it possible to reduce the entire length of the coil 50 while reducing the length of the magnetic path. The present embodiment is thus able to provide a thermally-assisted magnetic recording head that exhibits excellent write characteristics in high frequency bands and has the coil 50 of low resistance.

Further, the present embodiment allows the coil 50 to have a low heating value because of its low resistance. This makes it possible to prevent the occurrence of a problem that the components around the coil 50 may expand to cause part of the medium facing surface 80 to protrude toward the recording medium 90 and thus become more likely to collide with the recording medium 90. Further, the present embodiment allows for a reduction in the distance between the medium facing surface 80 and the recording medium 90 for improvements in write characteristics such as the overwrite property.

The remainder of configuration, function and effects of the present embodiment are similar to those of the first embodiment.

Fifth Embodiment

Figure 43:
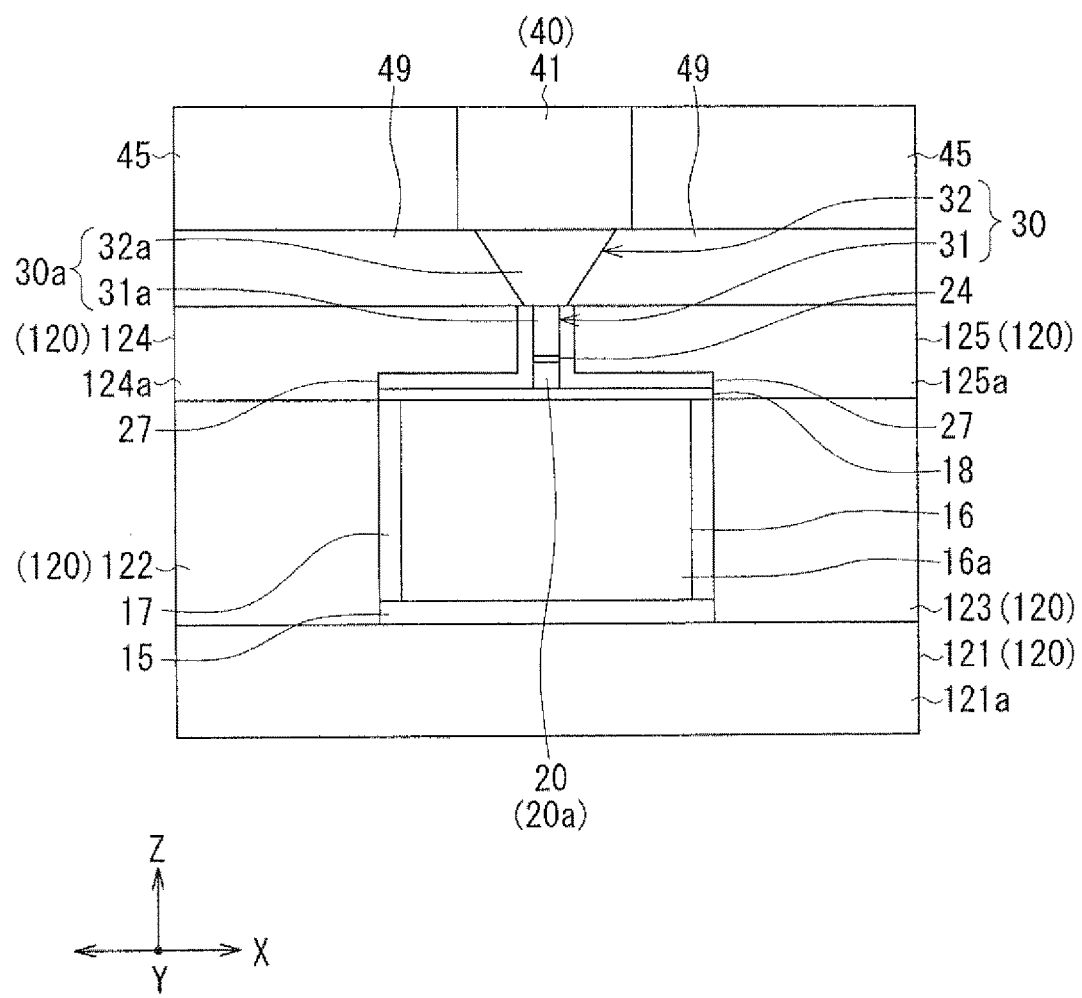
FIG. 43 is a front view showing the main part of a thermally-assisted magnetic recording head according to a fifth embodiment of the invention.

A thermally-assisted magnetic recording head according to a fifth embodiment of the invention will now be described with reference to FIG. 43. FIG. 43 is a front view showing the main part of the thermally-assisted magnetic recording head. FIG. 43 omits the illustration of the adhesion layer 19, the nonmagnetic metal films 25 and 33 and the dielectric film 26 described in the first embodiment section.

The thermally-assisted magnetic recording head according to the present embodiment is configured differently than the first embodiment as described below. The thermally-assisted magnetic recording head according to the present embodiment includes a shield 120 formed of a magnetic material, in place of the shield 12 of the first embodiment. The shield 120 includes a leading shield 121, a first side shield 124, a second side shield 125, a first coupling section 122 and a second coupling section 123.

The leading shield 121 is located on the leading side, i.e., the rear side in the direction of travel of the recording medium 90, relative to the core 16. In the present embodiment, the leading shield 121 lies on the return pole layer 11 shown in FIG. 5 and FIG. 6. The leading shield 121 has an end face 121a located in the medium facing surface 80, a top surface, and a bottom surface. The end face 121a is located on the leading side, i.e., the rear side in the direction of travel of the recording medium 90, relative to the front end face 16a of the core 16. The remainder of features of the leading shield 121 are the same as those of the shield 12 of the first embodiment.

The first and second side shields 124 and 125 are located on opposite sides of the first layer 31 of the main pole 30 in the track width direction (the X direction). In the present embodiment, the first and second side shields 124 and 125 are embedded in the cladding layer 18 and the surrounding layer 27. The surrounding layer 27 and the dielectric film 26 (see FIG. 3) are interposed between the first layer 31 and the first and second side shields 124, 125. The first side shield 124 has a first side shield end face 124a located in the medium facing surface 80, a top surface, and a bottom surface. The second side shield 125 has a second side shield end face 125a located in the medium facing surface 80, a top surface, and a bottom surface. The first and second side shield end faces 124a and 125a are located on opposite sides of the first end face portion 31a of the front end face 30a of the main pole 30 in the track width direction.

The first and second coupling sections 122 and 123 are located on opposite sides of the core 16 in the track width direction. The first coupling section 122 penetrates the cladding layers 15 and 17 and couples the leading shield 121 and the first side shield 124 to each other. The first coupling section 122 has a front end face located in the medium facing surface 80, a top surface, and a bottom surface. The bottom surface of the first coupling section 122 is in contact with a portion of the top surface of the leading shield 121. The top surface of the first coupling section 122 is in contact with the bottom surface of the first side shield 124.

The second coupling section 123 penetrates the cladding layers 15 and 17 and couples the leading shield 121 and the second side shield 125 to each other. The second coupling section 123 has a front end face located in the medium facing surface 80, a top surface, and a bottom surface. The bottom surface of the second coupling section 123 is in contact with another portion of the top surface of the leading shield 121. The top surface of the second coupling section 123 is in contact with the bottom surface of the second side shield 125.

The shield 120 has an end face located in the medium facing surface 80. The end face of the shield 120 includes the end face 121*a* of the leading shield 121, the first side shield end face 124*a* of the first side shield 124, and the second side shield end face 125*a* of the second side shield 125. In the present embodiment, the near-field light generating surface 20*a* of the plasmon generator 20 is located between the end face 30*a* of the main pole 30 and the end face 121*a* of the leading shield 121.

The thermally-assisted magnetic recording head according to the present embodiment further includes a nonmagnetic layer 49 formed of a nonmagnetic material and disposed around the second layer 32 of the main pole 30 in the vicinity of the medium facing surface 80. In the present embodiment, the heat sink 34 shown in FIG. 3 to FIG. 6 is disposed around the nonmagnetic layer 49 and respective portions of the first layer 31 and the second layer 32 at a location apart from the medium facing surface 80. The nonmagnetic material used to form the nonmagnetic layer 49 may be an insulating material or a nonmagnetic metal material. Examples of insulating materials that can be used to form the nonmagnetic layer 49 include silicon oxide ($SiO_2$) and alumina. Examples of nonmagnetic metal materials that can be used to form the nonmagnetic layer 49 include Ru and NiCr.

In the example shown in FIG. 43, the width of the second end face portion 32*a* of the front end face 30*a* of the main pole 30 in the track width direction (the X direction) increases with increasing distance from the first end face portion 31*a*. Alternatively, the width of the second end face portion 32*a* may be constant regardless of distance from the first end face portion 31*a*, as in the first embodiment.

In the present embodiment, the end face of the shield 120 includes the first and second side shield end faces 124*a* and 125*a* located on opposite sides of the first end face portion 31*a* of the front end face 30*a* of the main pole 30 in the track width direction. Thus, the shield 120 of the present embodiment can capture a magnetic flux produced from the first end face portion 31*a* of the front end face 30*a* of the main pole 30 and spreading in the track width direction, and can thereby prevent the magnetic flux from reaching the recording medium 90. Accordingly, the present embodiment makes it possible to sharpen the distribution of intensity of the write magnetic field in the track width direction and thereby achieve higher track density, when compared with the case where the first and second side shield end faces 124*a* and 125*a* are not provided. The present embodiment further makes it possible to form a magnetization transition region into a shape approximating a rectilinear shape, rather than a curved shape, on the recording medium 90 and thereby achieve higher linear recording density, when compared with the case where the first and second side shield end faces 124*a* and 125*a* are not provided. According to the present embodiment, the above-described functions and effects combined with the functions and effects described in the first embodiment section allow for further increase in recording density.

The remainder of configuration, function and effects of the present embodiment are similar to those of the first embodiment.

Sixth Embodiment

Figure 44:
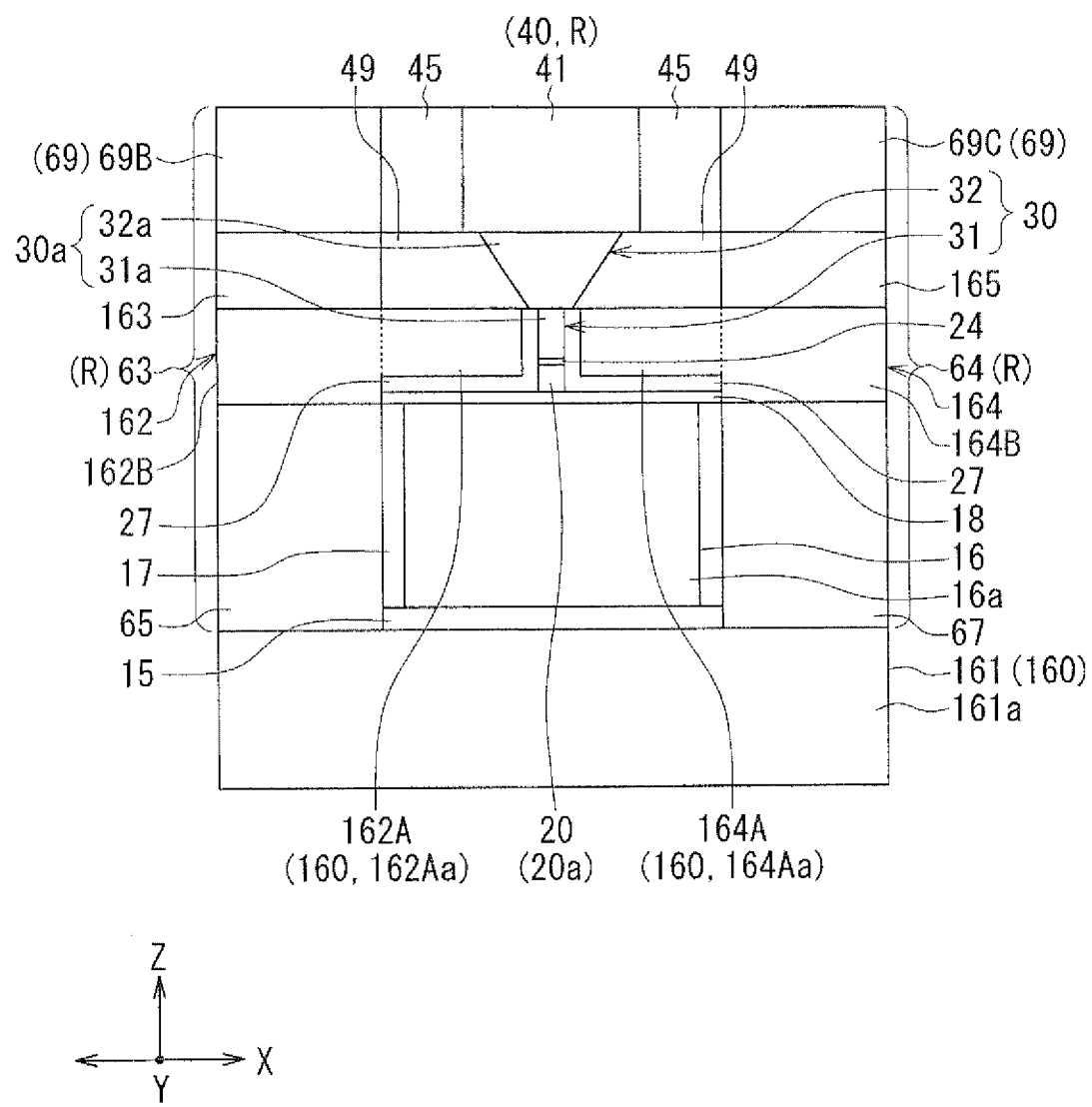
FIG. 44 is a front view showing the main part of a thermally-assisted magnetic recording head according to a sixth embodiment of the invention.

A thermally-assisted magnetic recording head according to a sixth embodiment of the invention will now be described with reference to FIG. 44. FIG. 44 is a front view showing the main part of the thermally-assisted magnetic recording head. FIG. 44 omits the illustration of the adhesion layer 19, the nonmagnetic metal films 25 and 33 and the dielectric film 26 described in the fourth (first) embodiment section.

The thermally-assisted magnetic recording head according to the present embodiment is configured differently than the fourth embodiment as described below. The thermally-assisted magnetic recording head according to the present embodiment includes a shield 160 in place of the shield 61 of the fourth embodiment, magnetic layers 162 and 163 in place of the magnetic layer 66 of the fourth embodiment, and magnetic layers 164 and 165 in place of the magnetic layer 68 of the fourth embodiment. Each of the shield 160 and the magnetic layers 162 to 165 is formed of a magnetic material. The thermally-assisted magnetic recording head further includes the nonmagnetic layer 49 described in the fifth embodiment section.

The shield 160 includes a leading shield 161, a first side shield 162A, and a second side shield 164A. The leading shield 161 is located on the leading side, i.e., the rear side in the direction of travel of the recording medium 90, relative to the core 16. In the present embodiment, the leading shield 161 lies on the nonmagnetic layer 10 shown in FIG. 39 and FIG. 40. The leading shield 161 has an end face 161*a* located in the medium facing surface 80, a top surface, and a bottom surface. The end face 161*a* is located on the leading side, i.e., the rear side in the direction of travel of the recording medium 90, relative to the front end face 16*a* of the core 16. The remainder of features of the leading shield 161 are the same as those of the shield 61 of the fourth embodiment.

The first and second side shields 162A and 164A are located on opposite sides of the first layer 31 of the main pole 30 in the track width direction (the X direction). In the present embodiment, the first and second side shields 162A and 164A are embedded in the surrounding layer 27. The surrounding layer 27 and the dielectric film 26 (see FIG. 3) are interposed between the first layer 31 and the first and second side shields 162A, 164A. The first side shield 162A has a first side shield end face 162Aa located in the medium facing surface 80. The second side shield 164A has a second side shield end face 164Aa located in the medium facing surface 80. The first and second side shield end faces 162Aa and 164Aa are located on opposite sides of the first end face portion 31*a* of the front end face 30*a* of the main pole 30 in the track width direction.

The shield 160 has an end face located in the medium facing surface 80. The end face of the shield 160 includes the end face 161*a* of the leading shield 161, the first side shield end face 162Aa of the first side shield 162A, and the second side shield end face 164Aa of the second side shield 164. In the present embodiment, the near-field light generating surface 20*a* of the plasmon generator 20 is located between the end face 30*a* of the main pole 30 and the end face 161*a* of the leading shield 161.

The magnetic layer 162 includes the first side shield 162A described above, and a coupling section 162B. In FIG. 44 the boundary between the first side shield 162A and the coupling section 162B is indicated in a dotted line. The magnetic layers 65 and 163 and the coupling section 162B penetrate the cladding layers 15, 17 and 18, the surrounding layer 27, the nonmagnetic layer 49 and the dielectric layer 35 (see FIG. 39), and connect a portion of the leading shield 161 and a portion of the magnetic layer 69 to each other. Each of the magnetic layers 65 and 163 and the coupling section 162B has a front end face located in the medium facing surface 80, a top surface, and a bottom surface. The bottom surface of the magnetic layer 65 is in contact with a portion of the top surface of the leading shield 161. The top surface of the magnetic layer 65 is in contact with the bottom surface of the coupling section 162B. The top surface of the coupling section 162B is in contact with the bottom surface of the magnetic layer 163. The top surface of the magnetic layer 163 is in contact with a portion of the bottom surface 69b (see FIG. 38) of the magnetic layer 69 that is included in the coupling section 69B.

The magnetic layer 164 includes the second side shield 164A described above, and a coupling section 164B. In FIG. 44 the boundary between the second side shield 164A and the coupling section 164B is indicated in a dotted line. The magnetic layers 67 and 165 and the coupling section 164B penetrate the cladding layers 15, 17 and 18, the surrounding layer 27, the nonmagnetic layer 49 and the dielectric layer 35 (see FIG. 39), and connect another portion of the leading shield 161 and another portion of the magnetic layer 69 to each other. Each of the magnetic layers 67 and 165 and the coupling section 164B has a front end face located in the medium facing surface 80, a top surface, and a bottom surface. The bottom surface of the magnetic layer 67 is in contact with another portion of the top surface of the leading shield 161. The top surface of the magnetic layer 67 is in contact with the bottom surface of the coupling section 164B. The top surface of the coupling section 164B is in contact with the bottom surface of the magnetic layer 165. The top surface of the magnetic layer 165 is in contact with a portion of the bottom surface 69b (see FIG. 38) of the magnetic layer 69 that is included in the coupling section 69C.

In the present embodiment, the second columnar portion 63 of the return path section R is constituted by the magnetic layers 65 and 163, the coupling section 162B of the magnetic layer 162, and the coupling section 69B of the magnetic layer 69. The third columnar portion 64 of the return path section R is constituted by the magnetic layers 67 and 165, the coupling section 164B of the magnetic layer 164, and the coupling section 69C of the magnetic layer 69. The second columnar portion 63 is connected to the leading shield 161 and the first side shield 162A. The third columnar portion 64 is connected to the leading shield 161 and the second side shield 164A.

In the example shown in FIG. 44, the width of the second end face portion 32a of the front end face 30a of the main pole 30 in the track width direction (the X direction) increases with increasing distance from the first end face portion 31a. Alternatively, the width of the second end face portion 32a may be constant regardless of distance from the first end face portion 31a, as in the first embodiment.

In the present embodiment, the end face of the shield 160 includes the first and second side shield end faces 162Aa and 164Aa located on opposite sides of the first end face portion 31a of the front end face 30a of the main pole 30 in the track width direction. Consequently, the present embodiment provides functions and effects similar to those resulting from the first and second side shield end faces 124a and 125a described in the fifth embodiment section.

The remainder of configuration, function and effects of the present embodiment are similar to those of the first, fourth or fifth embodiment.

The present invention is not limited to the foregoing embodiments, and various modifications may be made thereto. For example, as far as the requirements of the appended claims are met, the main pole 30 and the plasmon generator 20 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
a medium facing surface configured to face a recording medium;
a coil for producing a magnetic field corresponding to data to be written on the recording medium;
a main pole having a front end face located in the medium facing surface;
a waveguide including a core and a cladding, the core allowing light to propagate therethrough, the cladding being provided around the core;
a plasmon generator having a near-field light generating surface located in the medium facing surface;
a shield formed of a magnetic material and having an end face located in the medium facing surface; and
a return path section formed of a magnetic material, connecting the main pole and the shield to each other and passing a magnetic flux corresponding to the magnetic field produced by the coil, wherein
the main pole is configured to pass a magnetic flux corresponding to the magnetic field produced by the coil, and to produce from the front end face a write magnetic field for writing the data on the recording medium,
the plasmon generator is configured to excite a surface plasmon on the plasmon generator based on the light propagating through the core, and to generate near-field light from the near-field light generating surface based on the surface plasmon,
the front end face of the main pole and the near-field light generating surface are at locations different from each other in a direction of travel of the recording medium,
the front end face of the main pole includes a first end face portion, and a second end face portion contiguous with the first end face portion,
the second end face portion is located farther from the near-field light generating surface than is the first end face portion, and is greater than the first end face portion in width in a track width direction,
the first end face portion has a first edge and a second edge opposite to each other in the track width direction,
the near-field light generating surface has a third edge and a fourth edge opposite to each other in the track width direction, and a fifth edge and a sixth edge opposite to each other in the direction of travel of the recording medium,
an entire shape of the near-field light generating surface defined by the third to sixth edges is rectangular,
the first edge and the third edge are located on a first imaginary straight line, the second edge and the fourth edge are located on a second imaginary straight line parallel to the first imaginary straight line, the first edge and the second edge are straight lines parallel to each other in a plane of the front end face, the near-field light generating surface is located between the front end face of the main pole and at least part of the end face of the shield, the return path section includes a first yoke portion, a second yoke portion, a first columnar portion, a second columnar portion, and a third columnar portion, the first yoke portion, the second yoke portion and the first columnar portion are located on a same side in the direction of travel of the recording medium relative to the core, the first columnar portion is located away from the medium facing surface and has a first end and a second end opposite to each other in the direction of travel of the recording medium, the second and third columnar portions are located closer to the medium facing surface than is the first columnar portion, the first yoke portion connects the main pole to the first end of the first columnar portion, the second columnar portion and the third columnar portion are located on opposite sides of the plasmon generator in the track width direction, and are connected to the shield, the second yoke portion is connected to the second end of the first columnar portion, and is connected to the shield via the second and third columnar portions, and the coil is wound around the first columnar portion.

2. The thermally-assisted magnetic recording head according to claim 1, further comprising a dielectric layer provided between the main pole and the plasmon generator.

3. The thermally-assisted magnetic recording head according to claim 1, wherein the core has an evanescent light generating surface for generating evanescent light based on the light propagating through the core, the plasmon generator has a plasmon exciting section located at a predetermined distance from the evanescent light generating surface and facing the evanescent light generating surface, and in the plasmon generator, the surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

4. The thermally-assisted magnetic recording head according to claim 1, wherein the front end face of the main pole is located on a front side in the direction of travel of the recording medium relative to the near-field light generating surface.

5. The thermally-assisted magnetic recording head according to claim 1, wherein the main pole includes a first layer, and a second layer stacked on the first layer, the first layer has the first end face portion, and the second layer has the second end face portion.

6. The thermally-assisted magnetic recording head according to claim 5, wherein the first layer further has a first rear end face portion farthest from the medium facing surface, the second layer further has a second rear end face portion farthest from the medium facing surface, and the first rear end face portion and the second rear end face portion are located at a same distance from the medium facing surface.

7. The thermally-assisted magnetic recording head according to claim 6, further comprising a heat sink having an outer surface, wherein the plasmon generator has a top surface including a first region and a second region, the second region being located farther from the medium facing surface than the first region, the first layer of the main pole has a bottom surface opposed to the first region of the top surface of the plasmon generator, and a first side surface and a second side surface located at opposite ends of the first layer in the track width direction, the second layer of the main pole has a third side surface and a fourth side surface located at opposite ends of the second layer in the track width direction, and the outer surface of the heat sink includes: a first portion opposed to the second region of the top surface of the plasmon generator; a second portion opposed to the first rear end face portion; a third portion opposed to the second rear end face portion; a fourth portion opposed to at least part of the third side surface; and a fifth portion opposed to at least part of the fourth side surface.

8. The thermally-assisted magnetic recording head according to claim 7, wherein the outer surface of the heat sink further includes a sixth portion opposed to at least part of the first side surface, and a seventh portion opposed to at least part of the second side surface.

9. The thermally-assisted magnetic recording head according to claim 1, wherein the end face of the shield includes a first side shield end face and a second side shield end face located on opposite sides of the first end face portion of the front end face of the main pole in the track width direction.

10. A method of manufacturing the thermally-assisted magnetic recording head of claim 1, comprising the steps of:
forming the waveguide;
forming the plasmon generator and the main pole; and
forming the coil, wherein
the main pole is formed to include a first layer, and a second layer stacked on the first layer, the first layer having the first end face portion, the second layer having the second end face portion,
the step of forming the plasmon generator and the main pole includes the steps of:
forming an initial plasmon generator;
forming a first magnetic layer for use to form the first layer of the main pole;
etching the initial plasmon generator into the plasmon generator by using the first magnetic layer as an etching mask; and
forming a second magnetic layer on the first magnetic layer, the second magnetic layer being intended for use to form the second layer of the main pole.

11. A method of manufacturing a thermally-assisted magnetic recording head, the method comprising:
forming a waveguide including a core and a cladding, the core allowing light to propagate therethrough, the cladding being provided around the core;
forming a plasmon generator and a main pole; and
forming a coil for producing a magnetic field corresponding to data to be written on a recording medium where a medium facing surface is configured to face the recording medium, wherein the step of forming the plasmon generator and the main pole includes the steps of:
- forming an initial plasmon generator;
- forming an etching mask for use to pattern the initial plasmon generator;
- etching the initial plasmon generator into the plasmon generator by using the etching mask, the plasmon generator having a near-field light generating surface located in the medium facing surface;
- forming a surrounding layer of a dielectric material around the plasmon generator and the etching mask after the step of etching the initial plasmon generator;
- removing the etching mask so that a recess is formed by the plasmon generator and the surrounding layer; and
- forming a magnetic layer such that a portion thereof is received in the recess, the magnetic layer being intended for use to form the main pole, the main pole having a front end face located in the medium facing surface, the main pole is configured to pass a magnetic flux corresponding to the magnetic field produced by the coil, and to produce from the front end face a write magnetic field for writing the data on the recording medium, the plasmon generator is configured to excite a surface plasmon on the plasmon generator based on the light propagating through the core, and to generate near-field light from the near-field light generating surface based on the surface plasmon, the front end face of the main pole and the near-field light generating surface are at locations different from each other in a direction of travel of the recording medium, the front end face of the main pole includes a first end face portion, and a second end face portion contiguous with the first end face portion, the second end face portion is located farther from the near-field light generating surface than is the first end face portion, and is greater than the first end face portion in width in a track width direction, the first end face portion has a first edge and a second edge opposite to each other in the track width direction, the near-field light generating surface has a third edge and a fourth edge opposite to each other in the track width direction, and a fifth edge and a sixth edge opposite to each other in the direction of travel of the recording medium, an entire shape of the near-field light generating surface defined by the third to sixth edges is rectangular, the first edge and the third edge are located on a first imaginary straight line, the second edge and the fourth edge are located on a second imaginary straight line parallel to the first imaginary straight line, and the first edge and the second edge are straight lines parallel to each other in a plane of the front end face.

* * * * *